United States Patent
Saito

(10) Patent No.: US 10,304,231 B2
(45) Date of Patent: May 28, 2019

(54) IMAGE PROCESSING METHOD AND IMAGE PROCESSING DEVICE TO CREATE A MOVING IMAGE BASED ON A TRAJECTORY OF USER INPUT

(71) Applicant: SONY CORPORATION, Tokyo (JP)

(72) Inventor: Yuri Saito, Saitama (JP)

(73) Assignee: SONY CORPORATION, Tokyo (JP)

( * ) Notice: Subject to any disclaimer, the term of this patent is extended or adjusted under 35 U.S.C. 154(b) by 79 days.

(21) Appl. No.: 14/775,901

(22) PCT Filed: Feb. 10, 2014

(86) PCT No.: PCT/JP2014/000694
§ 371 (c)(1),
(2) Date: Sep. 14, 2015

(87) PCT Pub. No.: WO2014/147945
PCT Pub. Date: Sep. 25, 2014

(65) Prior Publication Data
US 2016/0027201 A1    Jan. 28, 2016

(30) Foreign Application Priority Data

Mar. 19, 2013  (JP) ................. 2013-055969

(51) Int. Cl.
*G06F 3/0481* (2013.01)
*G06F 3/0485* (2013.01)
(Continued)

(52) U.S. Cl.
CPC ............ *G06T 13/80* (2013.01); *G06F 3/0485* (2013.01); *G06F 3/04812* (2013.01); *G06F 3/04883* (2013.01); *G06T 3/40* (2013.01);
*H04N 5/23216* (2013.01); *H04N 5/23219* (2013.01); *H04N 5/23293* (2013.01); *H04N 5/23296* (2013.01);
(Continued)

(58) Field of Classification Search
CPC ....... G06F 2203/04806; G06F 3/04812; G06F 3/0485; G06F 3/04883; G06T 13/80; G06T 2210/12; G06T 3/40; H04N 5/23216; H04N 5/23219; H04N 5/23293; H04N 5/23296
See application file for complete search history.

(56) References Cited

U.S. PATENT DOCUMENTS 9,274,702 B2 *   3/2016   Nishidate ............ G06F 3/04883
2005/0078182 A1 *   4/2005   Lipsky .................. G06F 3/0481
                                                                           348/143
(Continued)

OTHER PUBLICATIONS

Akira Yamaguchi and Tetsuzo Kuragano, "A Fair Curve Generation Using a Hand-drawn Sketch for Computer Aided Aesthetic Design", International Conference on Engineering Design, ICED'07, Aug. 28-31, 2007.*

*Primary Examiner* — Sing-Wai Wu
(74) *Attorney, Agent, or Firm* — Chip Law Group

(57) ABSTRACT

A system includes circuitry that receives a user input, which may be a gesture. The system smoothes a trajectory of the user input to generate a smoothed trajectory, when the user input is a first gesture that traces the trajectory over an image. The system also applies an effect to the image to cause a target image to be enlarged and displayed on a display screen and to cause the target image to move based on the smoothed trajectory. The target image is a subset of the image.

19 Claims, 24 Drawing Sheets

(51) Int. Cl.
*G06F 3/0488* (2013.01)
*G06T 13/80* (2011.01)
*G06T 3/40* (2006.01)
*H04N 5/232* (2006.01)

(52) U.S. Cl.
CPC ............ *G06F 2203/04806* (2013.01);
*G06T 2210/12* (2013.01)

(56) References Cited

U.S. PATENT DOCUMENTS

2006/0114327 A1* 6/2006 Araya ............... G11B 27/034
348/207.99
2014/0267126 A1* 9/2014 Berg ................. G06F 3/0488
345/174
2014/0369563 A1* 12/2014 Kalevo .............. H04N 5/232
382/103

* cited by examiner

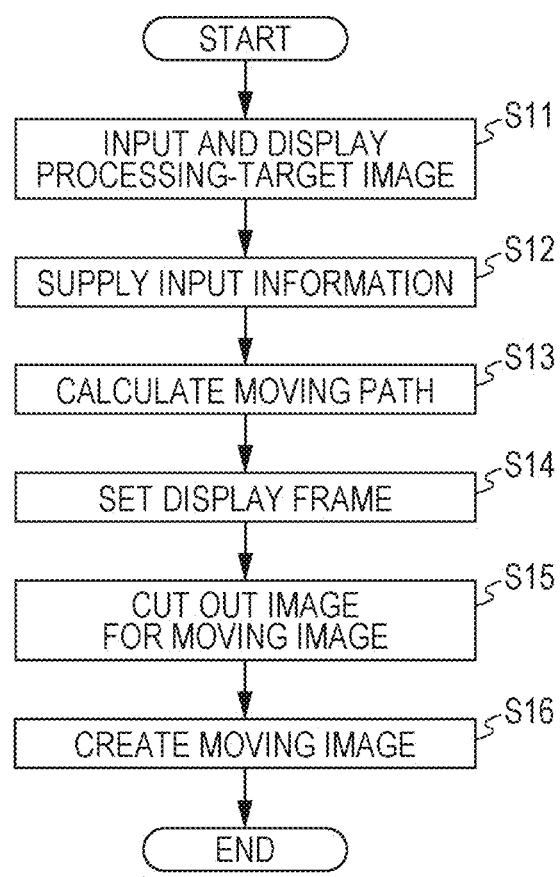

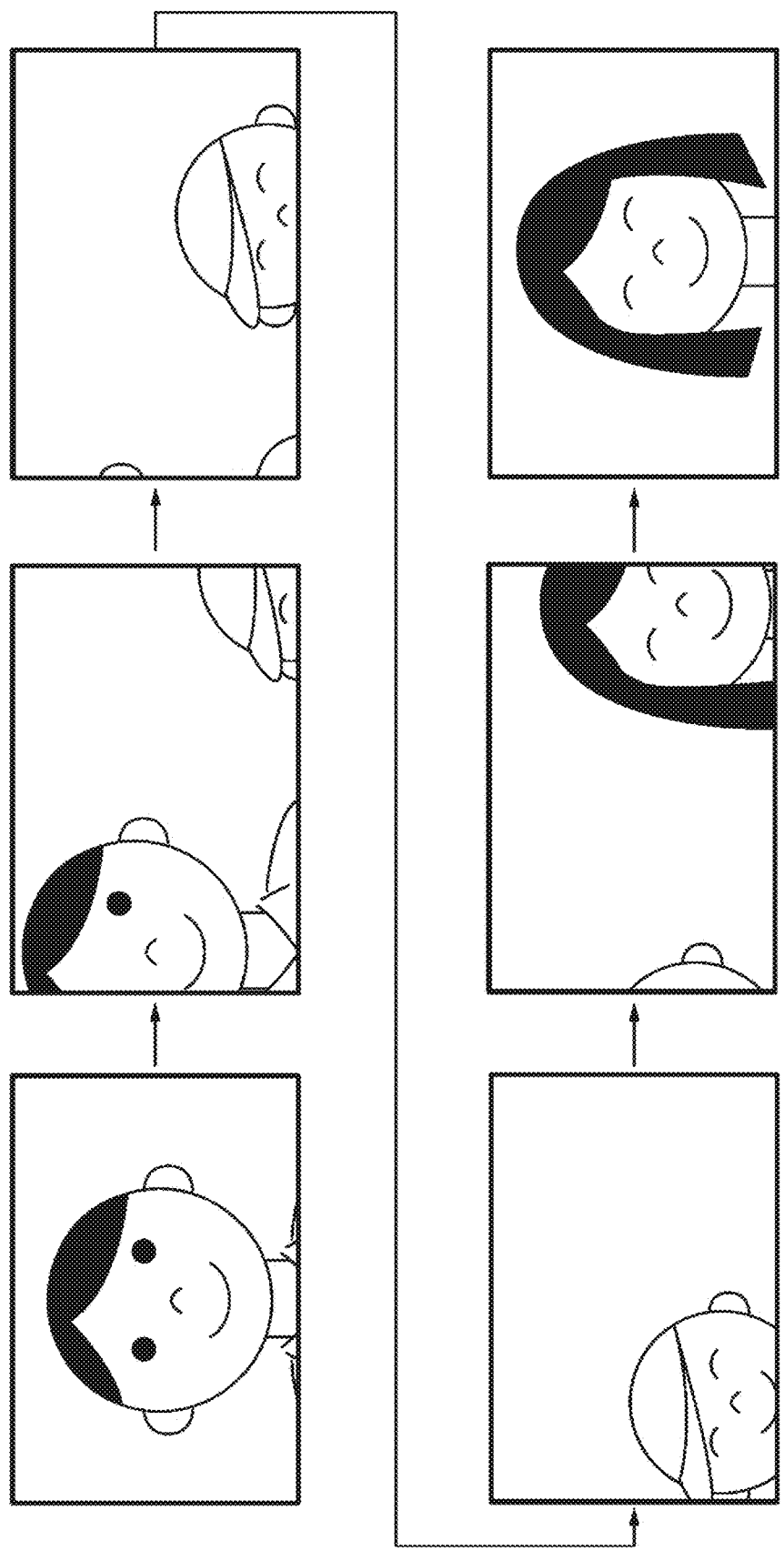

FIG. 15A
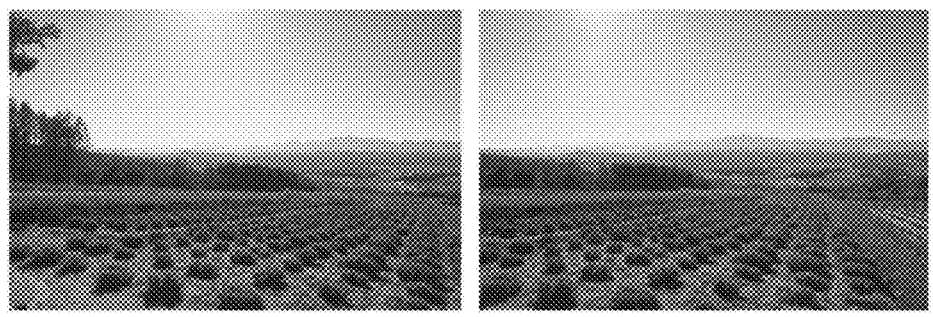
FIG. 15B

FIG. 16A
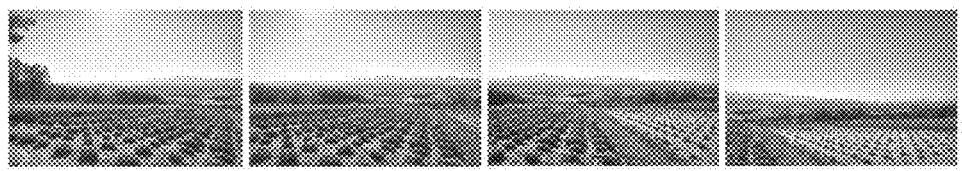
FIG. 16B
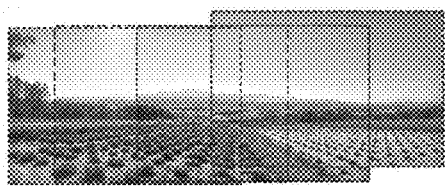
FIG. 16C
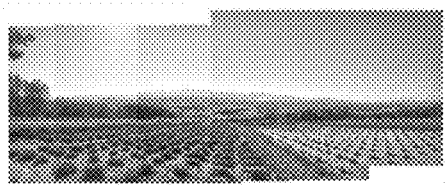

IMAGE PROCESSING METHOD AND IMAGE PROCESSING DEVICE TO CREATE A MOVING IMAGE BASED ON A TRAJECTORY OF USER INPUT

CROSS REFERENCE TO RELATED APPLICATIONS

This application claims the benefit of Japanese Priority Patent Application JP 2013-055969 filed Mar. 19, 2013, the entire contents of which are incorporated herein by reference.

TECHNICAL FIELD

The present technology relates to an image processing method, an image processing device and an image processing program.

BACKGROUND ART

In the related art, there is an image processing method, referred to as Ken Burns effect, as a special effect of adding motion to an image. A story line can be produced by employing the Ken Burns effect of adding the motion to one image using effects such as zoom-in, zoom-out, and panning.

In software in which the moving image is created from one image using the Ken Burns effect, first, a size of a display frame that determines a area in which a part is cut out of an image and a starting point and an ending point of the display frame are designated by the user. Then, it is common to create the moving image by calculating the moving path from these items of information (the size, the starting point and the ending point of the display frame), and by using the multiple images that are cut out each time the display frame moves.

On the other hand, among the software in which a moving image is created from one image using the Ken Burns effect, there is software in which detection of a subject is used (PTL 1). Specifically, first, the size of a display frame that determines a area in which a part is cut out of a still image, or a starting point and an ending point of the display frame are automatically calculated based on a size and a position of a face of a person detected from the image. Then, a moving image is created using the multiple images that are cut out each time the display frame moves. Furthermore, the constant size of the display frame and the moving path of the display frame are set in advance, and the moving image is created using the multiple images that are cut out each time the display frame moves.

CITATION LIST

Patent Literature

[PTL 1]
Japanese Unexamined Patent Application Publication No. 2006-304090.

SUMMARY

Technical Problem

However, in the former technique, if the number of images that are intended to be edited is great, or if the multiple starting points and the multiple ending points are intended to be designated on one image, there is a problem in that it takes a long time to set the size or the moving path of the display frame.

Furthermore, in the latter technique, based on the size or position of the arbitrary subject on which the user intends to perform panning and zooming, it is difficult to calculate the size of the display frame or the moving path of the display frame, and it is not necessarily guaranteed that the moving image that the user intends to express can be created.

It is desirable to provide an image processing method of, an image processing device for, and an image processing program for performing creating of a moving image easily.

Solution to Problem

In a first exemplary aspect, a system includes circuitry that receives a user input, which is a gesture. The circuitry smoothes a trajectory of the user input to generate a smoothed trajectory, when the user input is a first gesture that traces the trajectory over an image. The circuitry also applies an effect to the image to cause a target image to be enlarged and displayed on a display screen and to cause the target image to move based on the smoothed trajectory, where the target image is a subset of the image.

In a second exemplary aspect, an apparatus includes circuitry that receives a user input, which is a gesture. The circuitry smoothes a trajectory of the user input to generate a smoothed trajectory, when the user input is a first gesture that traces the trajectory over an image. The circuitry also applies an effect to the image to cause a target image to be enlarged and displayed on a display screen and to cause the target image to move based on the smoothed trajectory, where the target image is a subset of the image.

In a third exemplary aspect a method includes receiving, at a circuit, a user input, where the user input is a gesture. The method also includes smoothing a trajectory of the user input to generate a smoothed trajectory, when the user input is a first gesture tracing the trajectory over an image, and applying an effect to the image to cause a target image to be enlarged and displayed on a display screen and to cause the target image to move based on the smoothed trajectory, where the target image is a subset of the image.

In a fourth exemplary aspect, a non-transitory computer-readable medium encoded with computer-readable instructions thereon, where the computer-readable instructions when executed by a computer cause the computer to perform a method that includes receiving, at a circuit, a user input, the user input being a gesture. The method also includes smoothing a trajectory of the user input to generate a smoothed trajectory, when the user input is a first gesture tracing the trajectory over an image, and applying an effect to the image to cause a target image to be enlarged and displayed on a display screen and to cause the target image to move based on the smoothed trajectory, where the target image is a subset of the image.

Advantageous Effects of Invention

According to the present technology, a moving image can be created easily.

BRIEF DESCRIPTION OF DRAWINGS

FIG. 7 is a flow chart illustrating a flow of processing by the image processing device according to the first embodiment.

FIG. 9 is a diagram illustrating one example of a moving image that is created according to the present technology.

FIG. 15A is a diagram illustrating multiple images.

FIG. 15B is a diagram illustrating a processing-target image that is configured from combinations of the multiple images.

FIG. 16A is a diagram illustrating the multiple images.

FIG. 16B is a diagram illustrating the processing-target image that is configured from combinations of the multiple images.

FIG. 16C is a diagram illustrating a state in which the processing-target image configured from the combinations of the multiple images is shown to the user.

DESCRIPTION OF EMBODIMENTS

Figure 1:
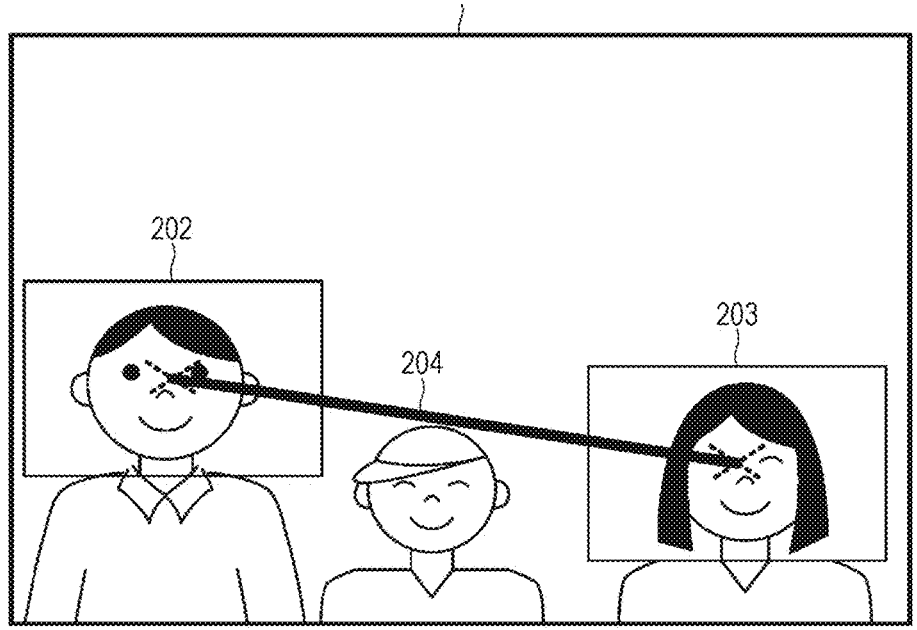
FIG. 1 is a diagram for describing an outline of processing by an image processing device.

Embodiments of the present technology are described below referring to the drawings. Moreover, descriptions are provided in the following order.
<1. First Embodiment>
(1-1. Configuration of an Image Processing Device)
(1-2. Configuration of the Imaging Apparatus)
(1-3. Processing in the Image Processing Device)
<2. Second Embodiment>
(2-1. Configuration of an Image Processing Device)
(2-2. Processing in the Image Processing Device)
<3. Third Embodiment>
(3-1. Configuration of an Image Processing Device)
(3-2. Processing in the Image Processing Device)
<4. Modification Examples>

First Embodiment 1-1. Configuration of an Image Processing Device

Figure 2:
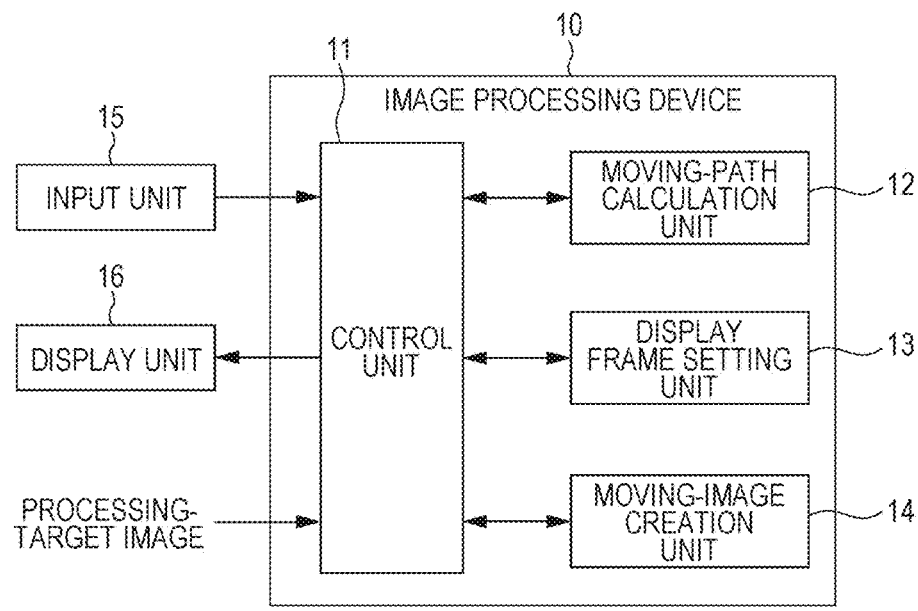
FIG. 2 is a block diagram illustrating a configuration of the image processing device according to a first embodiment of the present technology.

First, a configuration of an image processing device 10 is described referring to FIG. 1 and FIG. 2. The image processing device 10 creates a moving image on which an effect, such as panning, zoom-in, zoom-out, or the like is performed, by preforming processing, called a Ken Burns effect, on an image (hereinafter referred to as a processing-target image) that becomes a processing target.

FIG. 1 is a diagram for describing an outline of the processing by the image processing device 10. As illustrated in FIG. 1, the image processing device 10 sets a display frame on a processing-target image 201. The display frame indicates a display area of the moving image that is created by the image processing device 10. Furthermore, the display frame indicates an area that is cutout of the processing-target image 201 for the creating of the moving image. For the display frame, there are a frame 202 (hereinafter referred to as the beginning display frame) that indicates the display area at the time of starting the moving image and a frame 203 (hereinafter referred to as the terminating display frame) that indicates the display area at the time of terminating the moving image.

A position and a size of the zoom-in or the zoom-out that are the Ken Burns effect can be designated by changing a size of the display frame. As the display frame is smaller, the zoom-in on one part of the processing-target image occurs, resulting in shrinking the moving image. Furthermore, as the display frame is larger, the zoom-out occurs, resulting in expanding the moving image.

Moreover, the image processing device 10 sets a path 204 (hereinafter referred to as a moving path), as with a line segment illustrated in FIG. 1, along which the display frame moves on the processing-target image 201. The moving path 204 indicates an area on which the panning, the Ken Burns effect, is performed. A starting point of the moving path 204 is a center position of a beginning display frame 202 that indicates a beginning position of the moving image. Furthermore, an ending point of the moving path 204 is a center position of a terminating display frame 203 that indicates a terminating point of the moving image.

FIG. 2 is a block diagram illustrating a configuration of the image processing device 10. The image processing device 10 is configured from a control unit 11, a moving-path calculation unit 12, a display frame setting unit 13, and a moving-image creation unit 14. The image processing device 10 operates, for example, in apparatuses such as an imaging apparatus, a smart phone, a portable telephone, a personal computer, a tablet terminal, a server, and the like. However, the image processing device 10 may be configured as a single image processing device.

An input unit 15 and a display unit 16 that are included in the different apparatus described above are connected to the image processing device 10. However, the image processing device 10 itself may be configured to include the input unit and the display unit. Furthermore, the processing-target image is supplied from the different apparatus described above to the image processing device 10.

The input unit 15 is an input unit that receives an operation input from a user. The input unit and the display unit 16, for example, are integrated into one piece to make up a touch panel. The touch panel, for example, is a capacitive touch panel or a resistive touch panel. Input information indicating content that is input by the user from the input unit 15 is supplied to the image processing device 10.

The touch panel can detect each of the operations that are applied at the same time to multiple points on a screen that is an operation surface and can output information indicating a contact position of the operation. Furthermore, the touch panel can detect each of the repeated operations with respect to the operation surface and can output the information indicating the contact position of each of the repeated operations.

Accordingly, the touch panel receives various types of input and various operations, from the user, such as a so-called tap input, a double tap input, a flick operation, a drag operation, a pinch operation, a trace operation, and the like and can detect the various types of input and the various operations.

The tap input is an input motion in which a user's finger or the like is brought into contact with the operation surface only one time for a short period of time. The double tap input is an input motion in which the finger and the like are brought into contact with the operation surface consecutively two times at a short interval. These are used, for example, in inputting mainly determination.

The drag operation is an input motion in which the user's finger and the like moves while being in contact with the operation surface. The flick operation is an input motion in which the user's finger or the like indicates one point on the operation surface and then in that state, moves with a quick movement in an arbitrary direction. Accordingly, for example, when the multiple images that are retained in a storage medium are displayed for viewing, the images can be changed in such a manner that the images are turned one by one.

The pinch operation is an input motion in which the user's two fingers and the like first are brought into contact with the operation surface at the same time and next the two fingers or the like are made to spread out or a gap is narrowed between the two fingers in such a manner as to pick something up between the two fingers and the like. With the pinch operation, for example, the input for expanding or shrinking the frame indicating a region that is displayed on the display unit is possible. In addition, in the pinch operation, the operation in which the two fingers in contact are made to spread out is referred to as a pinch-out operation, and the operation in which the gap between the two fingers is narrowed is referred to as a pinch-in operation.

Moreover, the trace operation is an input motion in which the finger or the like is brought into contact with the operation surface and by moving the finger in that state, a straight-line or a circular-line input can be performed. According to the present embodiment, the user can perform an intuitive input by performing the inputting of the moving path with the trace operation.

When the input is applied with respect to the touch panel as the input unit 15, the input information indicating the contact position is supplied from the input unit 15 with respect to the control unit 11 of the image processing device 10.

The display unit 16 is an image display unit that is configured from a liquid crystal display (LCD), a plasma display panel (PDP), an electro luminescence (EL) panel, or the like. The processing-target image on which the processing is performed by the image processing device 10, the moving image created by the image processing device 10, and a different user interface (UI) are displayed on the display unit 16.

The control unit 11 performs transfer of the input information supplied, transfer of the processing-target image supplied, output of the created moving image, control of each part of the image processing device 10, control of the entire image processing device 10, and the like.

Furthermore, the control unit 11 converts an input position on the processing-target image, indicated by the supplied input information, into coordinates on the processing-target image that is displayed on the display unit 16. In addition, in the following description, the information that is converted into coordinate information is referred to as the input information. Then, the input information that is converted by the control unit 11 into the coordinates is supplied to the moving-path calculation unit 12.

Figure 3A:
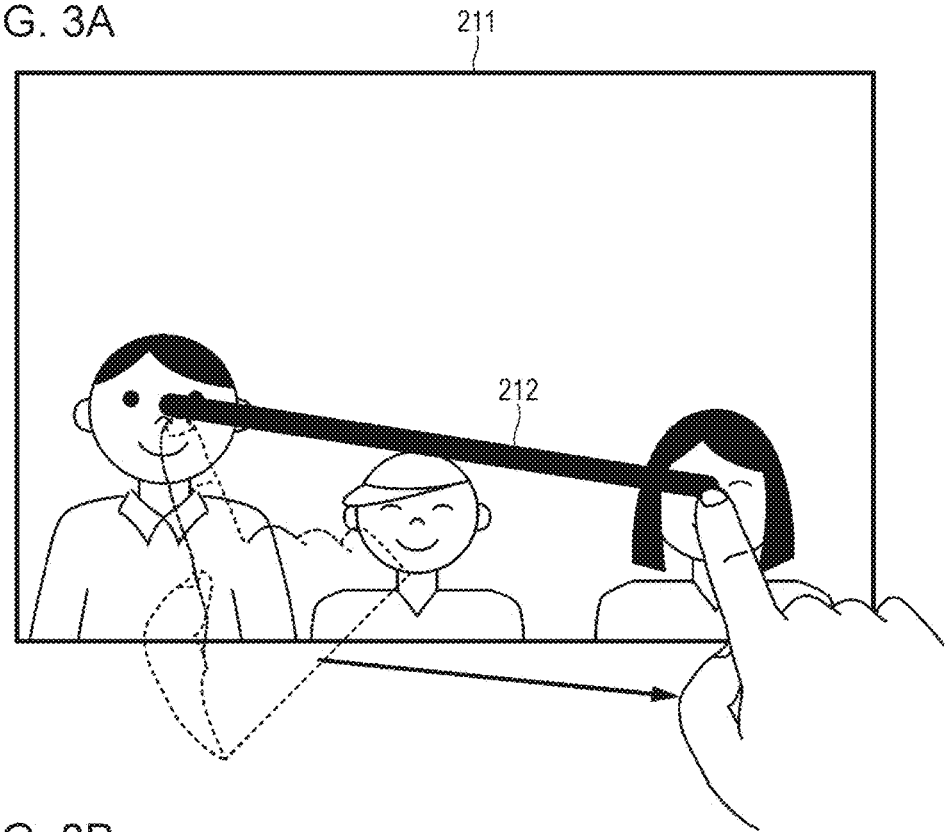
FIG. 3A is a diagram illustrating input information that, if an input unit is a touch panel, is input as a moving path by a user.

The moving-path calculation unit 12 obtains the moving path along which the display frame is moved, on the processing-target image, based on the supplied input information. In FIG. 3A, if the input unit is the touch panel, a thick line 212 on a processing-target image 211 is the input information that is input as the moving path with the trace operation by the user. The input information is equivalent to "successive multiple positions" in claims.

Figure 3B:
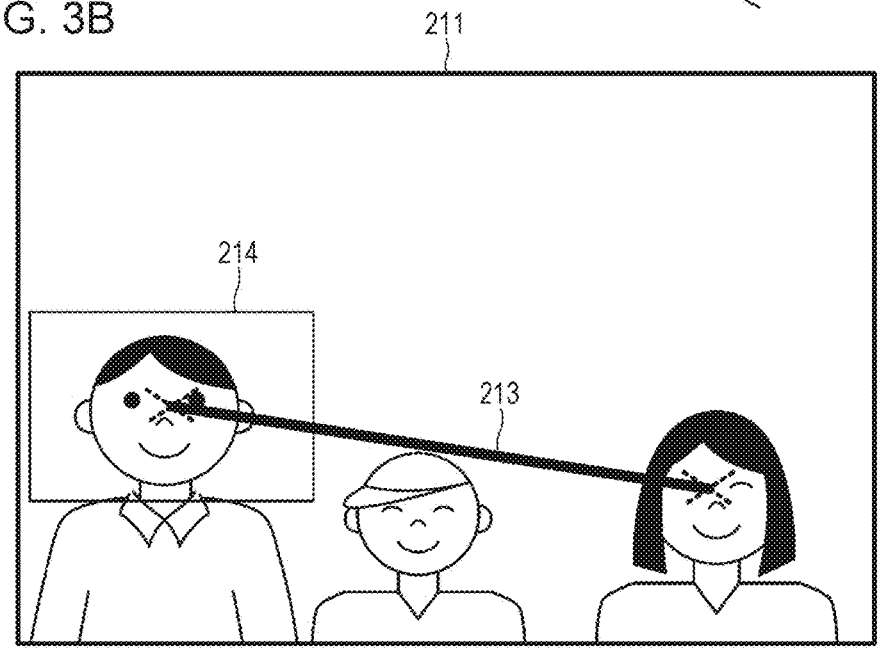
FIG. 3B is a diagram illustrating the moving path of a display unit that is calculated by a moving-path calculation unit.

For example, if the moving path is input by the user with respect to the touch panel, in the form of a line segment like the thick line 212 in FIG. 3A, a moving path 213 is calculated, as a line segment in FIG. 3B, by the moving-path calculation unit 12. In this case, the input information indicated by the thick line 212 and the moving path 213 determined by the moving-path calculation unit 12 are approximately the same. A display frame 214 moves with its center aligned along the moving path 213.

In this manner, if the input unit 15 is the touch panel, the user can designate the moving path by tracing the touch panel. For example, a position on the touch panel, with which the user's finger is brought into contact, can be set to be a beginning point of the moving path and a position on the touch panel, from which the user releases his/her finger, can be set to be a terminating point of the moving path.

Figure 4A:
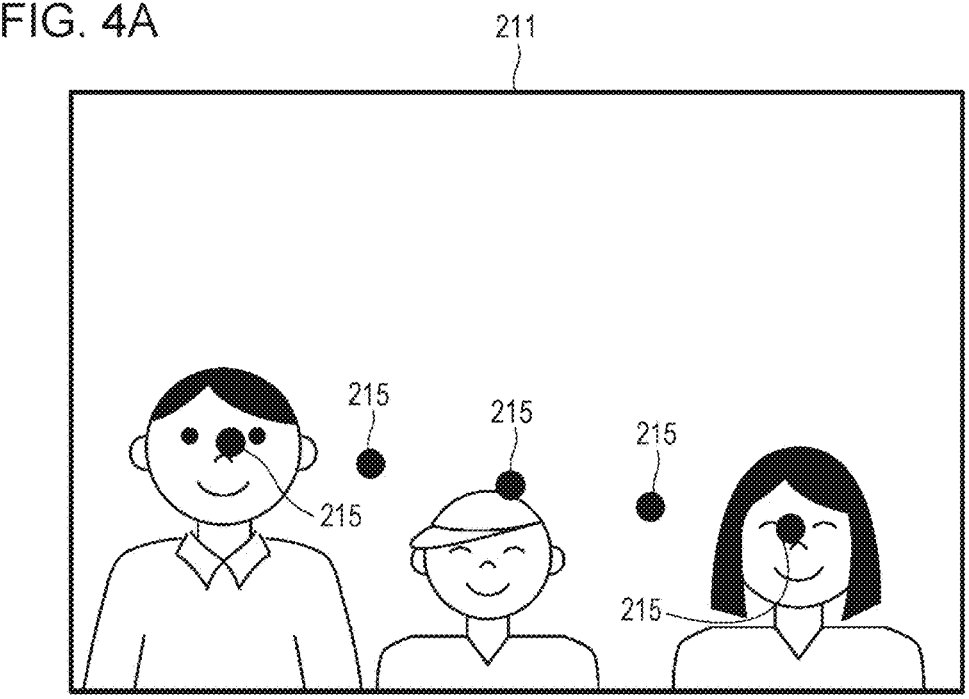
FIG. 4A is a diagram illustrating information that, if the input unit is a hardware button, is input as the moving path by the user.
Figure 4B:
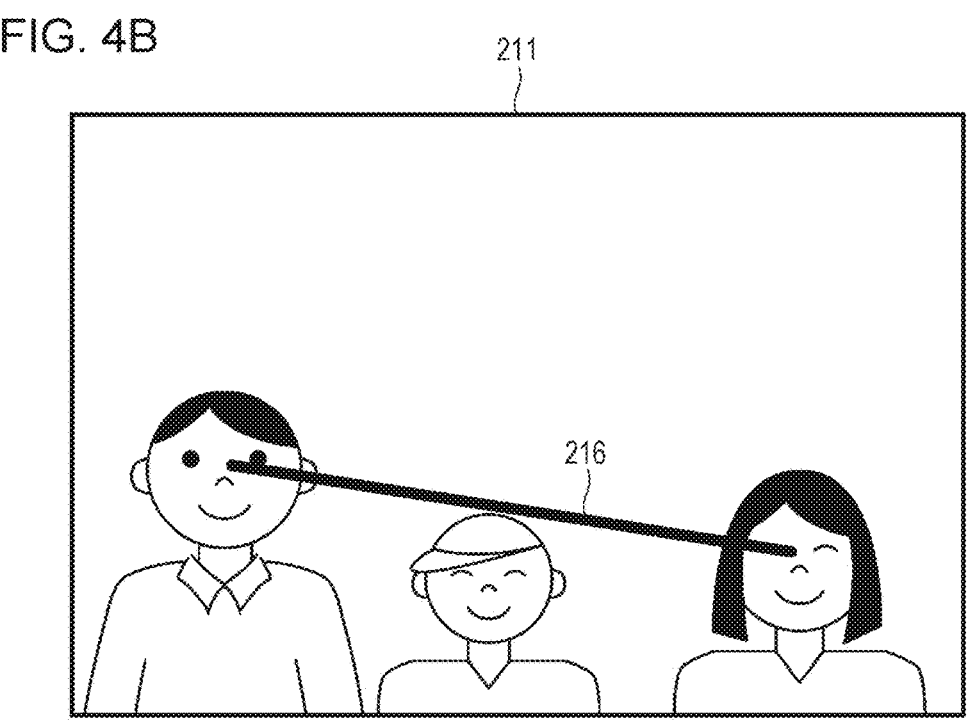
FIG. 4B is a diagram illustrating the moving path of the display unit that is calculated by the moving-path calculation unit.

Furthermore, if the input unit is a hardware button and the user can provide the input by plotting the moving path with a key operation with respect to an upward, downward, leftward and rightward key and the like and with an input to a button for determination, this is as illustrated in FIGS. 4A and 4B. As illustrated in FIG. 4A, if the input information is multiple points 215 that are plotted on the processing-target image, the moving path 216 is calculated by the moving-path calculation unit 12, as illustrated in FIG. 4B. In this case, the moving path 216 is obtained by linking the multiple points 215 that are plotted on the processing-target image, in order in which the multiple points 215 are input. The multiple points, which are plotted, also are equivalent to "successive multiple positions" in claims.

The display frame setting unit 13 sets a size of the display frame at a point in time when the movement of the display frame begins and at a point in time when the movement of the display frame terminates, depending on the input information from the user that is supplied. In addition, the starting point of the moving path is the center position of the beginning display frame indicating the beginning position of the moving image. Furthermore, the ending point of the moving path is the center position of the terminating display frame indicating the terminating point of the moving image.

Figure 5A:
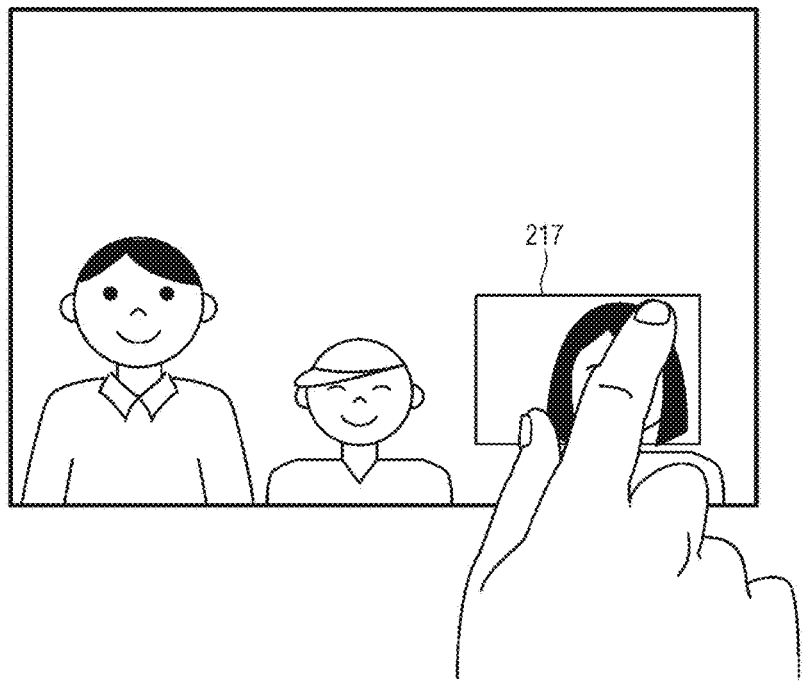
FIG. 5A is a diagram illustrating a state that appears before a size of a display frame is set by a pinch operation.
Figure 5B:
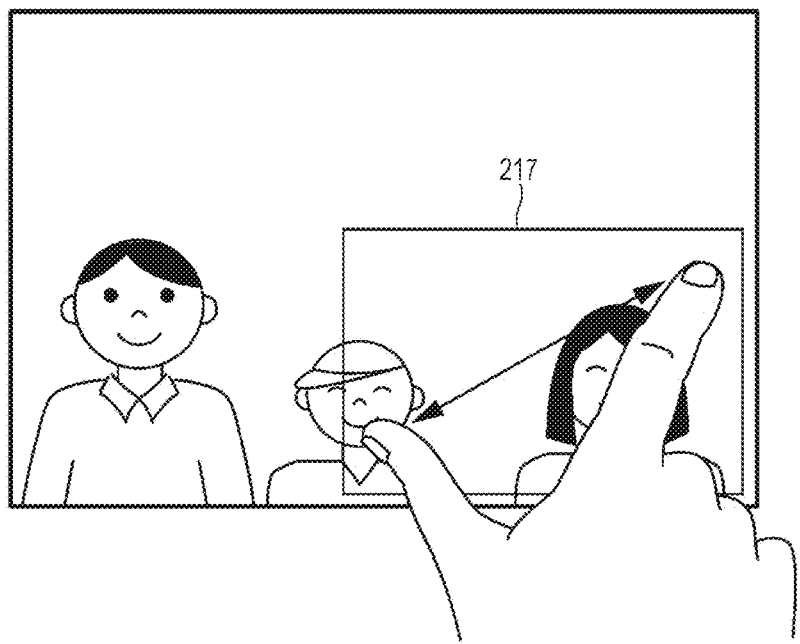
FIG. 5B is a diagram illustrating a state in which the size of display frame is set by the pinch operation.

If the input unit 15 is the touch panel, specifically, the setting of the display frame by the display frame setting unit 13 is as illustrated in FIG. 5A and FIG. 5B. In a state illustrated in FIG. 5A, when the user brings his fingers into contact with a region within a display frame 217 and then spreads out his fingers with the pinch operation, the input information due to the spreading-out of the fingers is supplied from the control unit 11 to the display frame setting unit 13. Then, as illustrated in FIG. 5B, a size of the display frame 217 is set by the display frame setting unit 13 to be increased, depending on a condition of the spreading-out of the fingers. Moreover, if a gap is narrowed between the fingers with the pinch operation, the size of the display frame is decreased. Accordingly, the size of the display frame can be changed intuitively and easily.

Furthermore, the user may change the size of the display frame by performing the drag operation in a state where his finger or the like is brought into contact with a side or an angle that makes up the display frame. If the input unit 15 is the hardware button, various examples of changing the size of the display frame are given such as one in which the beginning display frame or the terminating display frame is selected with the operation of the upward, downward, leftward, and rightward key and then the size of the display frame is changed depending on the upward, downward, leftward, and rightward key.

Furthermore, if the input unit 15 is an input means in the form of a dial, the size of the display frame may be changed by rotating the dial. For example, if the user rotates the dial clockwise, the display frame is increased, and conversely, if the user rotates the dial counterclockwise, the display frame is decreased.

The moving-image creation unit 14 creates the moving image that results from performing the Ken Burns effect on the processing-target image. The moving-image creation unit 14 first moves the display frame on the processing-target image, based on the moving path, and cuts out the image of the display frame size at predetermined intervals along the moving path. Because the cut-out image is used in creating the moving image, the cut-out image is referred to as an image for a moving image. For example, when the moving image of which a reproduction time is 5 seconds at 30 frames per second is created, the moving-image creation unit 14 cuts out the images for the moving image for 150 frames at equal intervals while the center of the display frame moves from the starting point of the moving path to the ending point.

Next, the moving-image creation unit 14 converts the cut-out images for the moving image, for example, into a size that agrees with a display size of the display unit. Accordingly, as the images for the moving image are cut out by the display frame that is smaller in size, higher scale factor is obtained.

Then, the moving-image creation unit 14 creates moving image data by setting one image for the moving image on which size conversion is performed, to be one frame, and thus reproducing the images for the moving image consecutively.

For example, if the display frame moves along the moving path in a state where the size is constant, the moving image on which the panning effect that scrolls one part of the image with a scale factor being constant is performed is created.

Furthermore, if only the size of the display frame changes with no center coordinates of the display frame changing, the moving image on which the zoom-in or the zoom-out effect that changes the scale factor of the still image is performed is created.

Moreover, if the size of the display frame changes and the center coordinates of the display frame moves along the moving path, the moving image on which the panning and the zoom-in or the zoom-out effect are performed is created.

The image processing device 10 is configured as described above.

In addition, a processing function of the image processing device 10 can be realized by various apparatuses such as a computer. In such a case, a program is provided in which processing details of the function that the image processing device 10 has to retain are described. Then, the processing function described above is realized on the apparatus by executing the program on the apparatus.

The program in which the processing details are described can be stored in a computer-readable recording medium such as an optical disk and a semiconductor memory. The recording medium can be placed on sale or provided as a software package. Furthermore, the program can be stored in a server, and can be on sale or provided as an application over a network.

Various apparatuses on which the program is to be executed, for example, store the program stored on the recording medium or the program transmitted from the server in their storage device. Then, the apparatus reads out the program from its storage device and executes the processing according to the program. Furthermore, the program can be executed by being installed in a memory in a control unit of the apparatus.

Furthermore, the apparatus can read out the programs directly from the recording medium and can execute the processing according to the program. Moreover, each time the program is transmitted from the server the apparatus can execute the processing one after another according to the received program.

However, the image processing device 10 may be realized not only by the program, but may be realized also by combining the hardware having each function into a dedicated apparatus.

Furthermore, the processing by the image processing device may be provided as a so-called cloud service to the user. The cloud service is a service that is provided by the server present on the network and is a form of using the Internet-based computer. The necessary processing is basically entirely executed on the part of the server. The user saves the data not only in his/her personal computer, smart phone, or portable telephone, but also in the server on the network. Consequently, the service can be used and reading, editing, and uploading of the data can also be performed in various environments, such as a home, a company, an Internet cafe, and a going-out destination. The image processing is performed on processing-target image that is retained in the cloud or is uploaded to the cloud on the part of the cloud, and the created moving image is retained in the cloud. Thus, in various environments, the use of the image processing and viewing of the moving image are possible.

1-2. Configuration of the Imaging Apparatus

Figure 6:
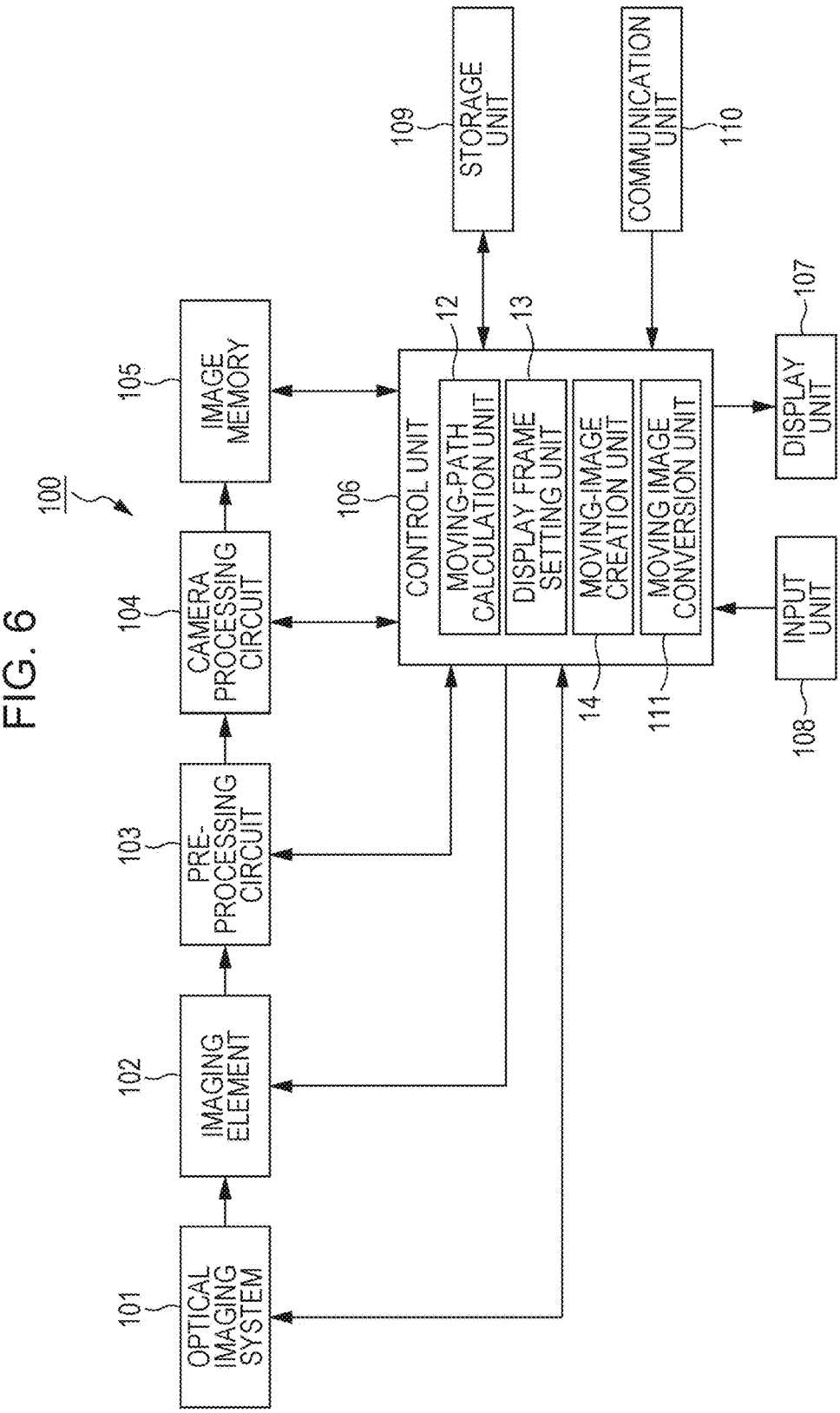
FIG. 6 is a block diagram illustrating a configuration of an imaging apparatus that is one example of an apparatus equipped with a function of the image processing device.

Next, a configuration of the imaging apparatus, one example of the apparatus in which the image processing device 10 operates, is described. FIG. 6 is a block diagram illustrating a configuration of an imaging apparatus 100.

The imaging apparatus 100 is configured from an optical imaging system 101, an imaging element 102, a pre-processing circuit 103, a camera processing circuit 104, the image memory 105, the control unit 106, the display unit 107, the input unit 108, the storage unit 109, and the communication unit 110.

The optical imaging system 101 is configured from a lens for concentrating light from a subject into the imaging element 102, a drive mechanism for performing focus alignment by moving the lens or performing the zoom, a shutter mechanism, an iris mechanism, and the like. An optical image of the subject that is obtained via the optical imaging system 101 is imaged on the imaging element 102 as an imaging device.

The imaging element 102 is driven based on a timing signal that is output from the control unit 106, incident light from the subject is photoelectricity-converted into an amount of electric charge, and is output as an analog imaging signal. The analog imaging signal that is output from the imaging element 102 is output to the pre-processing circuit 103. A charge coupled device (CCD), a complementary metal oxide semiconductor (CMOS), and the like are used as the imaging element 102.

The pre-processing circuit 103 performs sampling and holding and the like on the analog imaging signal that is output from the imaging element 102, in such a manner that a signal-to-noise (S/N) ratio is maintained as being good by correlated-double-sampling (CDA) processing. Moreover, the pre-processing circuit 103 controls a gain by performing auto gain control (AGC) processing, and outputs a digital image signal by performing analog-to-digital (A/D) conversion.

The camera processing circuit 104 performs signal processing, such as white balance adjustment processing, color correction processing, gamma correction processing, Y/C conversion processing, auto exposure (AE) processing and the like, on an image signal from the pre-processing circuit 103.

The image memory 105 is a buffer memory configured from a volatile memory, for example, a dynamic random access memory (DRAM), and temporarily saves the image data on which predetermined processing is performed by the pre-processing circuit 103 and the camera processing circuit 104.

The control unit 106 is configured, for example, from a CPU, a RAM, and a ROM. The program and the like that are read out by the CPU and operated are stored in the ROM. The RAM is used as memory at work for the CPU. The CPU performs control of the entire imaging apparatus 100 by executing various processing tasks according to the program stored in the ROM and thus issuing a command. Furthermore, the control unit 106 executes the program including the function of the image processing device and thus functions as the image processing device 10, specifically, the moving-path calculation unit 12, the display frame setting unit 13, the moving-image creation unit 14, and a moving image conversion unit 111.

The display unit 107 is a display means that is configured, for example, from an LCD, a PDP, an organic EL panel, or the like. A through image in the middle of shooting, the image recorded in the storage medium, the processing-target image, the created moving image, various UIs, and the like are displayed on the display unit 107.

The input unit 108 is an input means that is made, for example, from a power source button for switching on and off the power source, a release button for issuing an instruction to start to record a captured image, an operation part for adjusting zoom, a touch panel, a touch screen configured to be integrated into the display unit 107 as one piece and the like. When the input is applied to the input unit 108, a control signal that depends on such an input is generated and the generated control signal is output to the control unit 106. Then, the control unit 106 performs operational processing or control that corresponds to such a control signal.

The storage unit 109, for example, is a large-capacity storage medium, such as a hard disk, a solid state drive (SSD), a memory stick (Sony Cooperation's registered trademark), and a SD memory card. The photographing-completed image that becomes the processing-target image, the moving image created by the image processing device, and the like are retained in the storage unit 109 in a predetermined format.

The photographing-completed image that becomes the processing-target image is retained in the storage unit 109, for example, in a state where the photographing-completed image is compressed based on the standard such as joint photographic experts group (JPEG). The moving image is retained in the storage unit 109, in the format such as moving picture experts group (MPEG), or audio video interleaving (AVI). Furthermore, information relating to the retained image and exchangeable image file format (EXIF) data including additional information such as a photographing date are also retained in such a manner as to be matched to the retained image.

The communication unit 110, for example, is a network interface for communication with a different apparatus over the Internet based on a predetermined protocol, or a network such as a dedicated line. The telecommunication system may be any one of cable communication, a wireless local area network (LAN), wireless fidelity (Wi-Fi), a 3G network, a 4G network, communication using long term evolution (LTE), and the like. It may be possible that the moving image created by the present technology is uploaded to a service on the Internet via the communication unit 110 and is transmitted to a different apparatus such as a personal computer.

The moving-path calculation unit 12, the display frame setting unit 13, the moving-image creation unit 14 are the same as those described referring to FIG. 2. The moving image conversion unit 111 performs processing for conversion into a predetermined moving-image format such as MPEG, or AVI on the moving image created by the moving-image creation unit 14 and outputs the moving image data.

If the moving image is converted into such formats, there is an advantage in that the moving image can be easily uploaded to an Internet-based service such as social networking service (SNS) and a moving-image sharing site. Furthermore, when converting the moving image into such formats, there is an advantage in that an effect such as a picture effect can be added.

As described above, the imaging apparatus 100 is configured. In addition, as illustrated above, the imaging apparatus 100 is one example of the apparatus in which the image processing device 10 operates. The image processing device 10 may operate in apparatuses such as a smart phone, a portable telephone, a personal computer, a tablet terminal, and a server.

1-3. Processing in the Image Processing Device

Next, processing performed in the image processing device 10 is described. FIG. 7 is a flow chart illustrating a flow of processing by the image processing device 10.

First, in Step S11, the processing-target image is supplied to the control unit 11. The supplied processing-target image is displayed on the display unit 16 under the control of the control unit 11 and is shown to the user. The processing-target image is the photographing-completed image that is already captured and is retained in the storage medium and the like. However, if the apparatus in which the image processing device 10 operates is an imaging apparatus, a photographing-enabled smart phone, a portable telephone and the like, the processing-target image may be an image that is present before completing photographing and may be an image that makes up the through image. It may be possible for selection to be made between a mode in which the user creates the moving image from the photographing-completed image and a mode in which the user creates the moving image in the through image.

Next, in Step S12, the input information indicating the input by the user with respect to the input unit 15 is supplied to the control unit 11. Such input information is supplied from the control unit 11 to the moving-path calculation unit 12, the display frame setting unit 13, and the moving-image creation unit 14. Next, in Step S13, the moving path is calculated by the moving-path calculation unit 12, based on the input information from the user. Next, in Step S14, the size of the display frame is set by the display frame setting unit 13, based on the input information.

In addition, the calculation of the moving path in Step S13 and the setting of the display frame in Step S14 are not limited to the order illustrated in the flow chart in FIG. 7. The setting of the display frame may be performed first, and then the calculation of the moving path may be performed. Furthermore, first, the setting of a starting-point display frame may be performed in the display frame setting unit 13, the calculation of the moving path may be performed in the moving-path calculation unit 12, and then the setting of an ending-point display frame may be performed in the display frame setting unit 13. This is determined in the order of the inputting by the user.

Next, in Step S15, the cutting-out of the images for the moving image, which has the size of the display frame, is performed by the moving-image creation unit 14, along the moving path. Next, in Step S16, the images for the moving image are size-converted by the moving-image creation unit 14, such images for the moving image are reproduced and thus the moving image data is created with one image for the moving image as one frame.

Figure 8A:
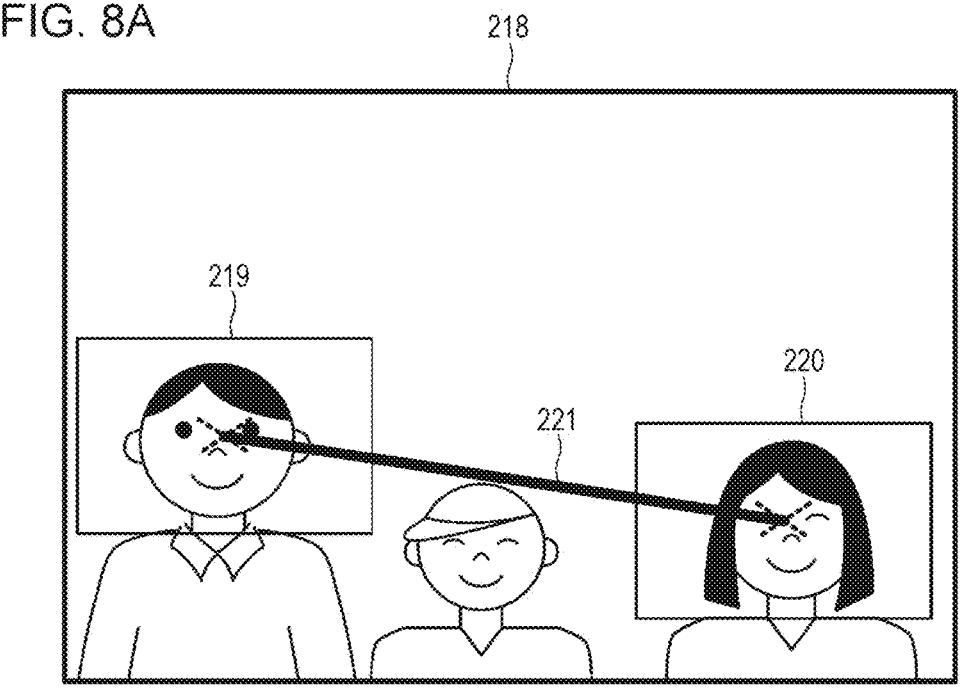
FIG. 8A is a diagram illustrating one example of input information from the user.
Figure 8B:
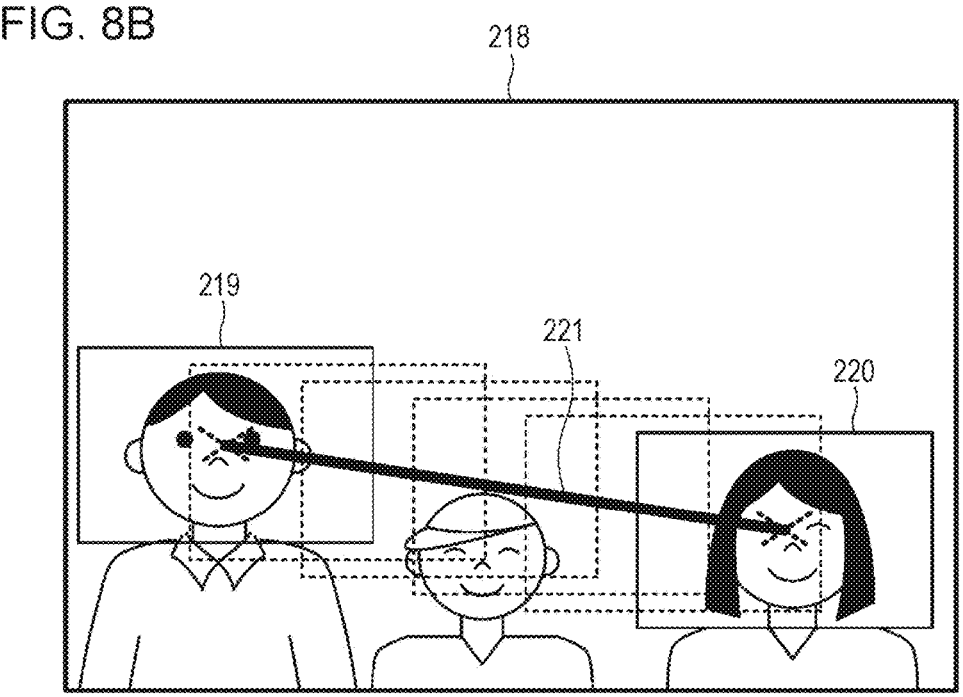
FIG. 8B is a diagram illustrating one example of input information from the user.

For example, if a beginning display frame 219, a terminating display frame 220, and a moving path 221 are present with respect to a processing-target image 218 as illustrated in FIG. 8A, a trace of the movement of the display frame is as indicated by a dashed line in FIG. 8B. In addition, the moving path 221 is set to move from left to right in the processing-target image 218.

In this case, the created moving image is as illustrated in FIG. 9. Because the beginning display frame 219 and the terminating display frame 220 are the same in size and the moving path 221 is set in such a manner as to move from left to right in the processing-target image 218, the moving image becomes the moving image on which the panning is performed from left to right in the processing-target image 218.

Figure 10A:
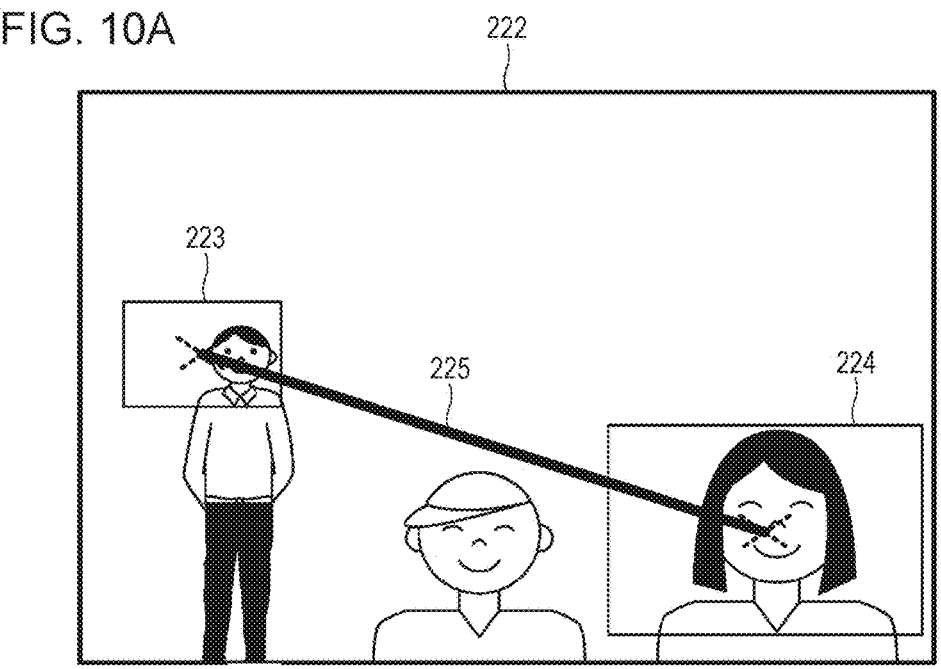
FIG. 10A is a diagram illustrating a different example of the input information from the user.
Figure 10B:
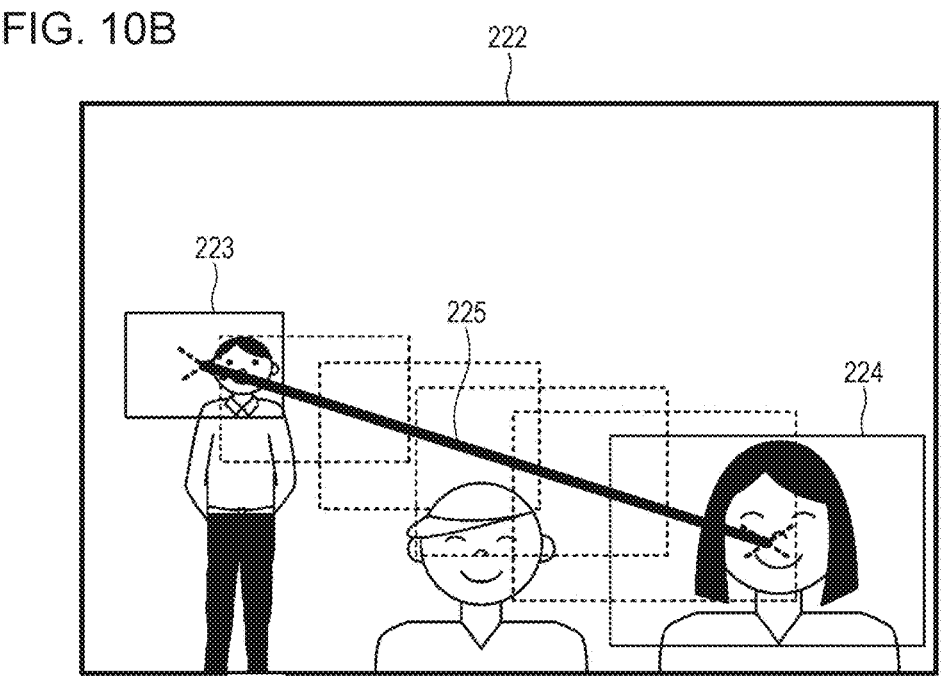
FIG. 10B is a diagram illustrating a different example of the input information from the user.

Furthermore, if a beginning display frame 223, a terminating display frame 224, and a moving path 225 are present with respect to a processing-target image 222 as illustrated in FIG. 10A, a trace of the movement of the display frame is as indicated by a dashed line in FIG. 10B. In addition, the moving path 225 is set to move from left to right in the processing-target image 222.

Figure 11:
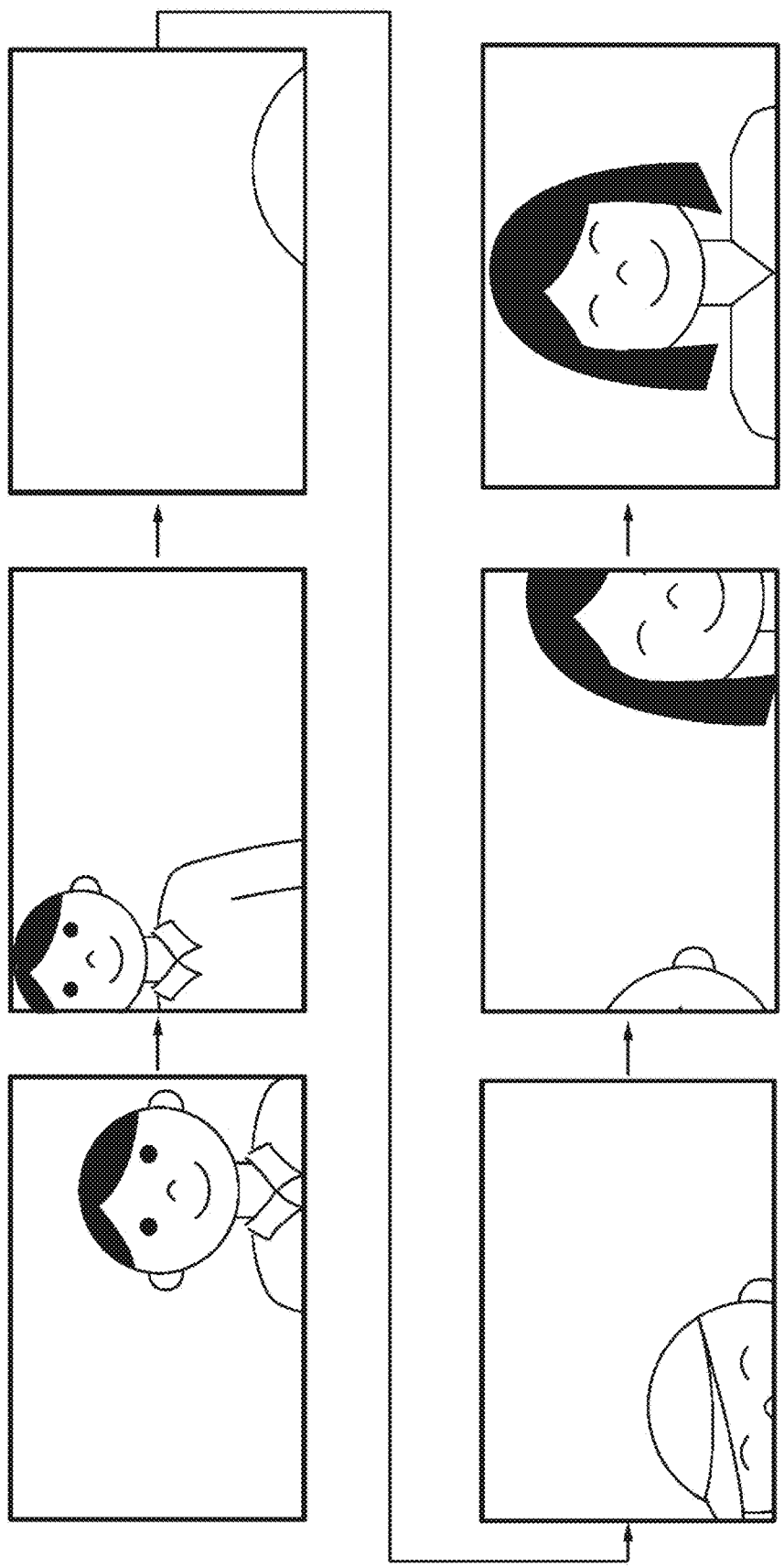
FIG. 11 is a diagram illustrating a different example of the moving image that is created according to the present technology.

In this case, the created moving image is as illustrated in FIG. 11. Because the terminating display frame 224 is larger than the beginning display frame 223 and the moving path 225 is set in such a manner as to move from left to right in the processing-target image 222, the moving image becomes the moving image on which the panning is performed from left to right in the processing-target image 222 and on which the zoom-out is performed at the same time.

As described above, the moving image is created by the image processing device 10 from the processing-target image. According to the present technology, the user can perform the creating of the moving image intuitively and easily because the moving image on which the Ken Burns effect is performed can be created by tracing only the subject in the processing-target image that is intended to be noticeable to a viewer.

Next, an example is described in which if the input unit 15 is the touch panel, the more detailed calculation of the moving path and the setting of the display frame are performed depending on a type of input operation by the user.

As a first example, the mapping of a speed of tracing on the touch panel by the user to a reproduction speed of the moving image is considered. For example, if the speed of tracing by the user is high, the reproduction speed of the moving image is increased, and if the speed of tracing is low, the reproduction speed of the moving image is decreased. Such processing can be performed when the moving-image creation unit 14 to which the input information is supplied from the user adjusts the interval at which the image for the moving image is cut out and the reproduction speed of the image for the moving image.

Accordingly, for example, the moving image that is more impressive with slowing-up and speeding-up being involved can be created intuitively by slowing up the trace operation with respect to a region of the processing-target image that the user intends to be noticeable to the viewer and by speeding up the trace operation with respect to the other regions.

As a second example, if the touch panel that is the input unit 15 is a resistive touch panel, the mapping of pressure of the inputting by the user to a zoom ratio is considered. If the user strongly pushes down the touch panel, the zoom-in is performed on the moving image by decreasing the size of the display frame with the input position being in the center, depending on the extent of the pressure of the input.

Furthermore, if the user brings his/her finger into contact with the touch panel and then gradually moves it away from there, the zoom-out is performed on the moving image by increasing the size of the display frame with the input position being in the center. When this is done, because if the user strongly pushes down the region of the touch panel which he/she intends to be noticeable to the viewer by zooming-in, this is sufficient, he/she can perform the creating of the moving image intuitively. Such processing is performed by the display frame setting unit 13 to which the input information is supplied from the user.

Furthermore, if the input unit 15 is the hardware button and the inputting of the moving path is performed by a plot, the reproduction speed of the moving image may be changed by be mapping to a distance between the plots. Such processing can be performed when the moving-image creation unit 14 to which the input information is supplied from the user adjusts the interval at which the image for the moving image is cut out and the reproduction speed of the image for the moving image.

Figure 12:
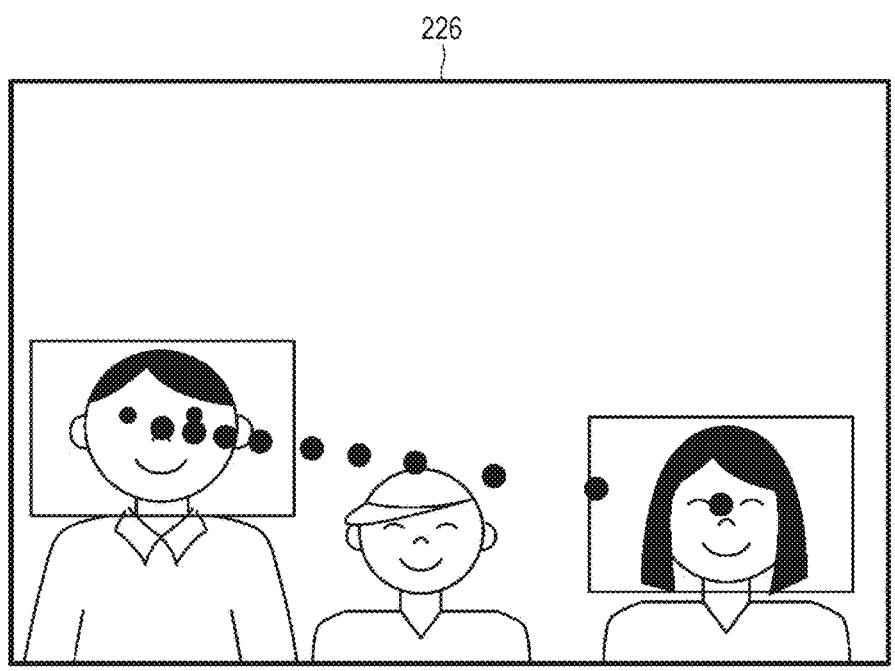
FIG. 12 is a diagram illustrating an example of the input information that, if the input unit is the hardware button, is input as the moving path by the user.

For example, as illustrated in FIG. 12, in a range where the distance between the plots by the user is small (concentration of the plots is high) as in the vicinity of a subject on the left side of the processing-target image 226, the reproduction speed of the moving image is decreased. On the other hand, in a range where the distance between the plots is large (concentration of the plots is low) as in the vicinity of the subject on the right side of a processing-target image 226, the reproduction speed of the moving image is increased. Accordingly, even though the input unit 15 is the hardware button, the intuitive creating of the moving image is made possible.

If the image processing device 10 operates in the apparatus that has an imaging function, such as the imaging apparatus or the smart phone, the processing-target image may not only be the photographing-completed image but may also be the image that is retained in a buffer and the like and makes up the through image. In this case, the inputting of the moving path may be performed on the touch panel, and a preview may be started from a point in time when the user's finger is moved away from the touch panel.

Figure 13A:
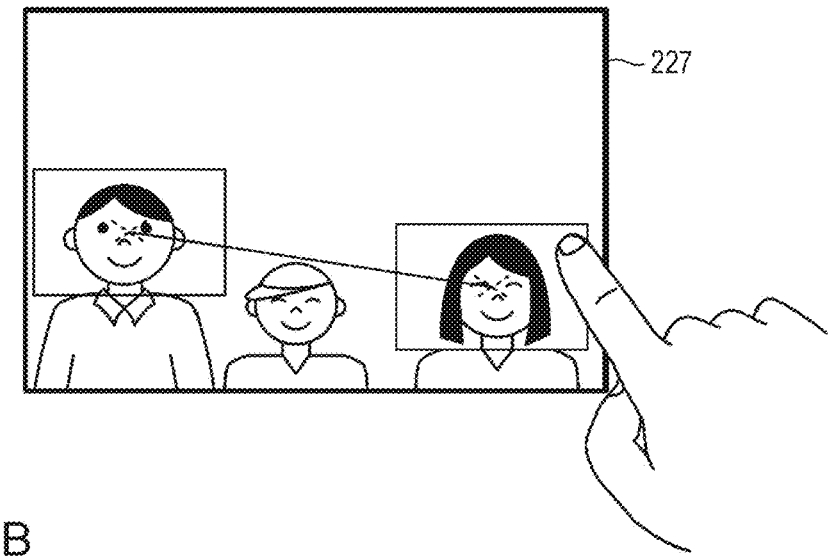
FIG. 13A is a diagram illustrating a state in which the inputting is performed by the user.
Figure 13B:
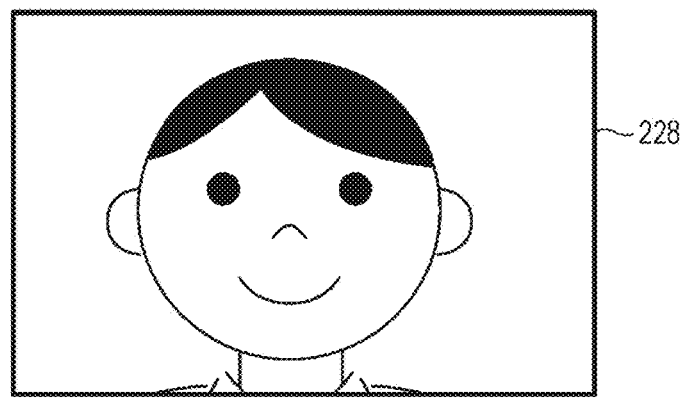
FIG. 13B is a diagram illustrating a state in which a preview is started after the inputting by the user is terminated.
Figure 13C:
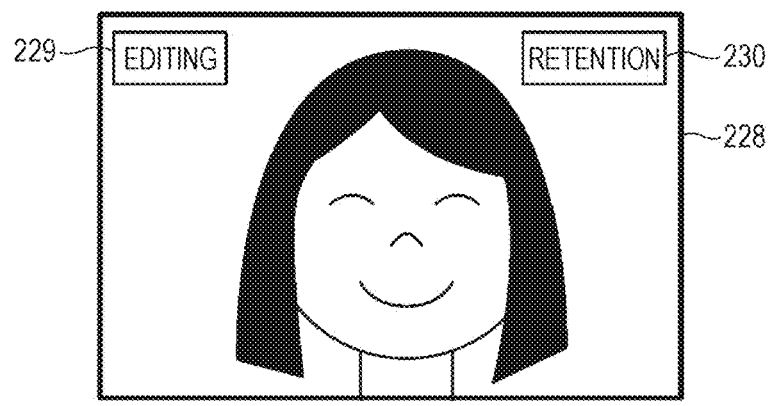
FIG. 13C is a diagram illustrating a state in which the preview is terminated.

This respect is described referring to FIG. 13A, FIG. 13B, and FIG. 13C. In addition, in FIG. 13A, FIG. 13B, and FIG. 13C, only the inputting by the user of the input information indicating the moving path is set to be performed. Furthermore, the input for designation by the user of the size of the display frame is set to be not present and the size of the display frame is set by default.

As illustrated in FIG. 13A, when the user performs the input indicating the moving path on a processing-target image 227 that is displayed on the display unit 16 and moves his/her finger away from the touch panel, the moving image is created by the moving-image creation unit 14. Then, a moving image 228 is started to be previewed on the display unit 16 immediately after the user's finger is moved away from the touch panel as illustrated in FIG. 13B. In this case, the position on the touch panel, with which the user's finger comes into contact, is the starting point of the moving path and the position from which the user's finger is moved away from the touch panel is the terminating point of the moving path.

Then, when the moving image 228 is reproduced to the end, as illustrated in FIG. 13C, in the display unit 16, a mode transition button 229 for transition to a mode in which the re-inputting of the moving path and the re-setting of the display frame are performed is displayed on the moving image 228, in such a manner as to overlap the moving image 228. When the inputting by the user is performed on the mode transition button 229, the image processing device 10 transitions to a moving-image edit mode, a moving-path re-input edit mode. Furthermore, as illustrated in FIG. 13C, when a retention button 230 for issuing an instruction to retain the moving image is displayed, and the inputting by the user is performed on the retention button 230, the moving image may be converted into the predetermined moving-image format and may be retained.

In this manner, as soon as the inputting by the user of the moving path is completed, the preview is started. Thus, the user can check the moving image immediately after inputting.

Accordingly, the inputting, the checking, and retaining of the moving image can be performed speedily in an easy-to-understand manner.

Figure 14:
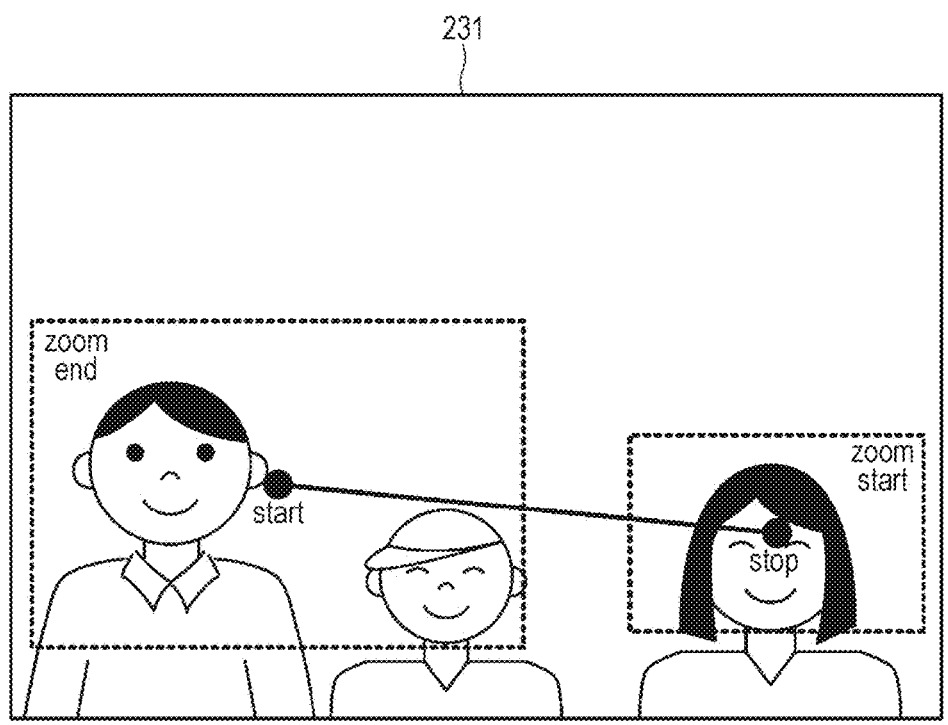
FIG. 14 is a diagram illustrating a mode in which content that is input by the user is displayed.

Furthermore, as illustrated in FIG. 14, the input information that is input by the user may be displayed on a processing-target image 231 and may be shown to the user. In FIG. 14, a line segment indicating the moving path, a string of letters "start" indicating the beginning position of the moving path, and a string of letters "stop" indicating the terminating position of the moving path are displayed.

Moreover, a frame indicating the beginning display frame, a string of letters "zoom start" indicating the beginning display frame, and a string of letters "zoom end" indicating the terminating display frame are displayed. Such the input information may be typically displayed at the time of inputting by the user and may be displayed depending on the inputting by the user of an instruction to perform display. The input content is displayed in this manner and is shown to the user. Thus, the user can easily check the content that he/she inputs. In addition, expressions "start," "stop," "zoom start," and "zoom end" are only examples, and other strings of letters, icons, and the like may be possible.

Next, an application example of the processing-target image is described. The processing-target image is not limited to one image and combinations of the multiple images may be possible. FIG. 15A and FIG. 15B illustrate a first example in which the processing-target image is configured from the combinations of the multiple images.

FIG. 15A illustrates the multiple images before combination. In the first example, as illustrated in FIG. 15B, one processing-target image is configured from the multiple images being made adjacent to each other in such a manner as not to overlap each other.

FIG. 16A, FIG. 16B, and FIG. 16C illustrate a second example in which the processing-target image is configured from the combinations of the multiple images. FIG. 16A illustrates the multiple images before combination. In the second example, as illustrated in FIG. 16B, one processing-target image is configured from regions of the multiple images, in which the subjects are consistent with each other, being made to overlap each other. This can be performed by combining the images that, by performing image-matching processing, are determined as being consistent with each other. In addition, as illustrated in FIG. 16C, for the user, the multiple images may be displayed as one processing-target image.

The processing in which the processing-target image is configured from combinations of such images may be performed in the control unit 11 to which the image is supplied, and such a processing-target image may be supplied from the control unit 11 to the moving-path calculation unit 12, the display frame setting unit 13, and the moving-image creation unit 14.

The range that is reflected in the moving image can be widened by configuring one processing-target image using the multiple images in this manner, and a scope of expression in the moving image can be broadened. Furthermore, for example, the same scenes are photographed at different times and thus are combined to configure the processing-target image and the panning is performed on the processing-target image using the Ken Burns effect. As a result, the moving image showing a passage of time can be created.

Second Embodiment 2-1. Configuration of the Image Processing Device

Figure 17:
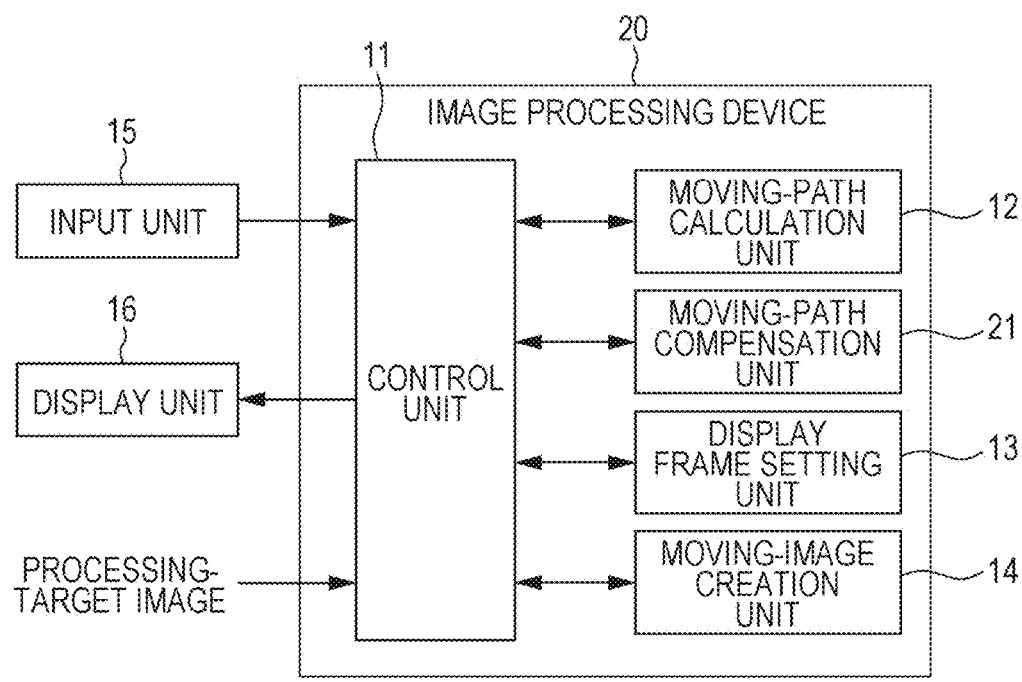
FIG. 17 is a diagram illustrating a configuration of an image processing device according to a second embodiment of the present technology.

Next, a second embodiment of the present technology is described. FIG. 17 is a block diagram illustrating a configuration of an image processing device 20 according to the second embodiment. Moreover, the same constituent elements as in the first embodiment are given like reference numerals, and their descriptions are omitted. The second embodiment is different from the first embodiment in that the second embodiment includes a moving-path compensation unit 21.

The moving-path compensation unit 21 compensates the moving path of the display frame that is obtained by the moving-path calculation unit 12. The moving-image creation unit 14 creates the moving image, based on the moving path that is compensated by the moving-path compensation unit 21.

Figure 18A:
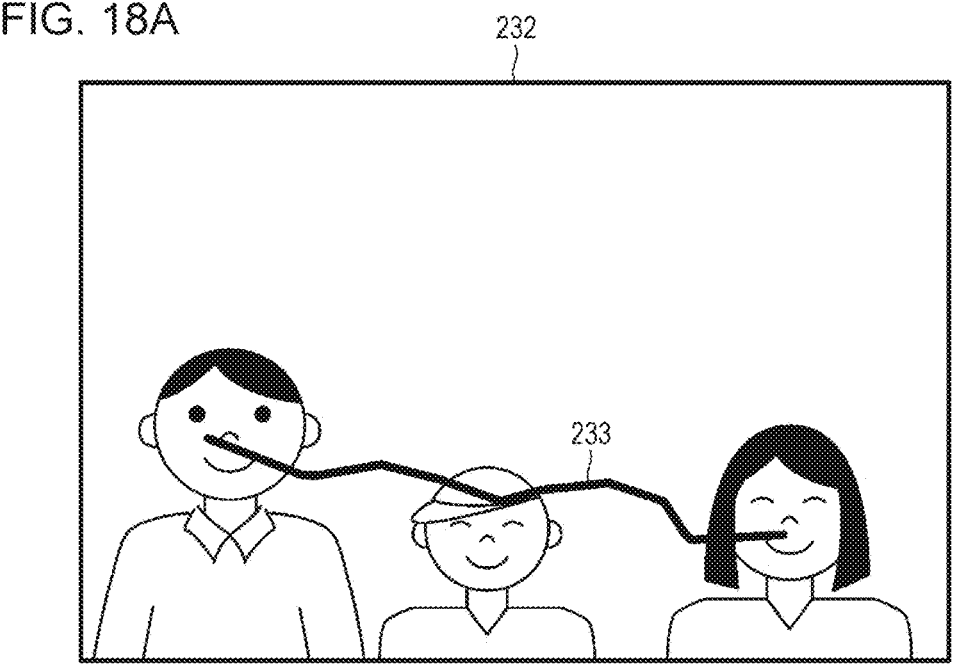
FIG. 18A is a block diagram illustrating the moving path that is determined based on the input information from the user.
Figure 18B:
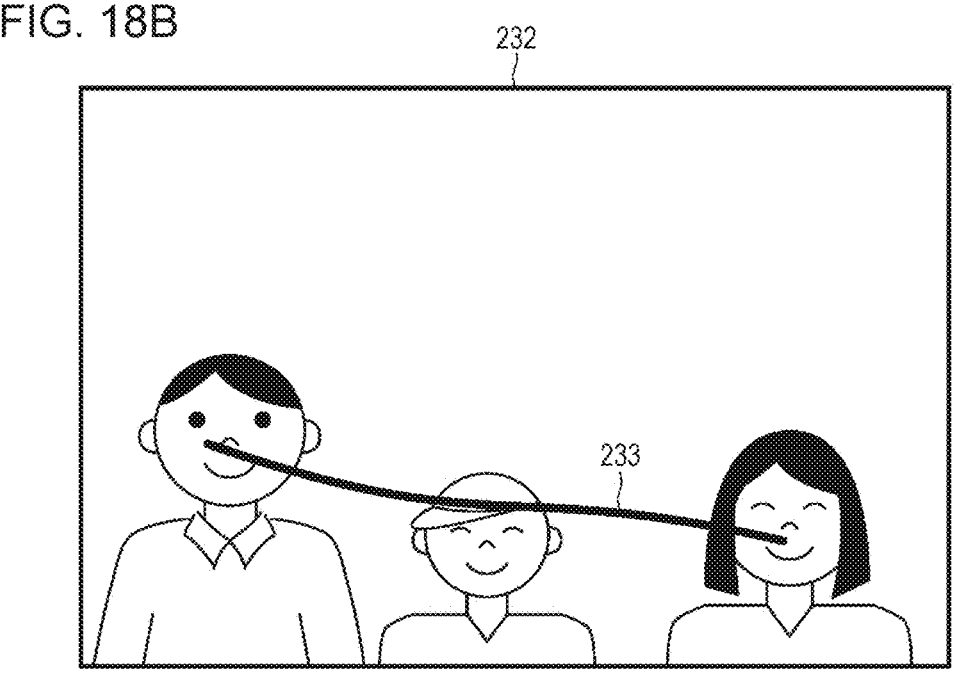
FIG. 18B is a diagram illustrating the moving path that is compensated by a moving-path compensation unit.

The compensating of the moving path is described referring to FIG. 18A and FIG. 18B. If the input unit 15 is the touch panel, the moving path is obtained based on the input information that is input by performing the trace operation by the user. However, in the trace operation, there is a case where the finger is moved in a direction that the user does not intend and thus the moving path is distorted. When the moving path is a distorted moving path, because a panning effect is performed along the distorted moving path, the created moving image is difficult to view. Accordingly, the moving-path compensation unit 21 compensates the moving image in such a manner that the moving path is in a straight line or in a smooth curved line and makes it easy to view the moving image, by applying a known line-segment conversion technology to the moving path that is calculated based on the input information from the user.

FIG. 18A illustrates one example of the moving path on a processing-target image 232 that is calculated based on the input information from the user. It is understood from FIG. 18A that a moving path 233 is distorted without being in a straight line or in a smooth curved line. Accordingly, the moving-path compensation unit 21 sets the moving path 233 to be in a smooth line segment as illustrated in FIG. 18B by performing compensation processing. The moving image becomes easy to view because the moving path 233 is set to be in a smooth line segment.

The image processing device 20 according to the second embodiment is configured as described above. In addition, the second embodiment is the same as the first embodiment in that the image processing device 20 operates in apparatuses such as the imaging apparatus, the smart phone, the personal computer, the tablet terminal, and the server, in that the image processing device 20 may be configured as a single image processing device, and in that the image processing device 20 may be provided as a program.

2-2. Processing in the Image Processing Device

Figure 19:
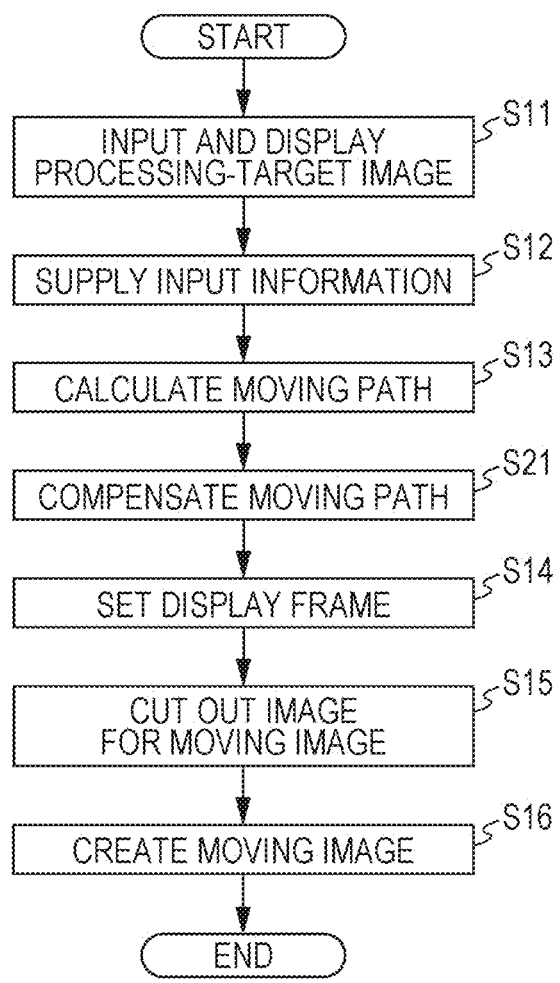
FIG. 19 is a flow chart illustrating a flow of processing by the image processing device according to the second embodiment.

FIG. 19 is a flow chart illustrating a flow of processing according to the second embodiment of the present technology. Moreover, the same processing as in the first embodiment are given like step numbers, and their descriptions are omitted.

The input information is supplied from the user, and the moving path is obtained by the moving-path calculation unit 12. Thereafter, in Step S21, the compensation processing is performed by the moving-path compensation unit 21 on the moving path. Then, as in the first embodiment, in Steps S14 to S16, the moving image is created based on the moving path.

The second embodiment of the present technology is configured as described above. According to the second embodiment, the moving-image creation unit 14 creates the moving image by cutting out the image for the moving image along the moving path, based on the compensated coordinate information. Thus, the panning effect is smoothly performed on the moving image, thereby making the moving image easy to view.

Third Embodiment 3-1. Configuration of the Image Processing Device

Figure 20:
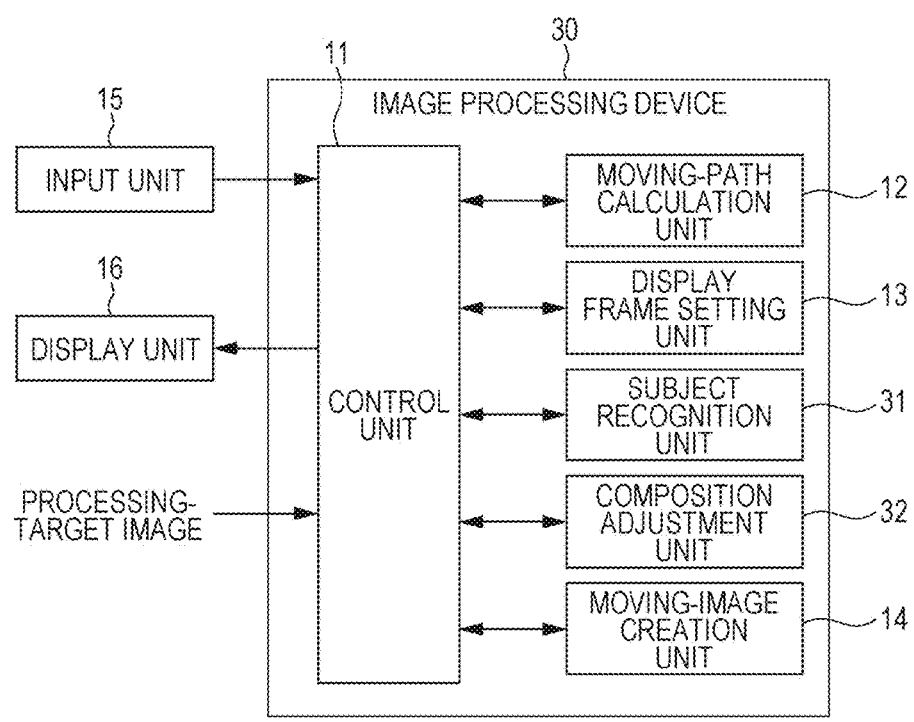
FIG. 20 is a block diagram illustrating a configuration of an image processing device according to a third embodiment of the present technology.

Next, a third embodiment of the present technology is described. FIG. 20 is a block diagram illustrating a configuration of an image processing device 30 according to the third embodiment. Moreover, the same constituent elements as in the first embodiment and the second embodiment are given like reference numerals, and their descriptions are omitted. The third embodiment is different from the first and second embodiments in that the third embodiment includes a subject recognition unit 31 and a composition adjustment unit 32.

The subject recognition unit 31 recognizes the subject such as an object and a person in the processing-target image by performing known subject recognition processing and the like. A face/object recognition technology using template matching, a matching method based on brightness distribution information on the subject, a method based on a beige portion included in the image and characteristics of a human face, and the like may be used as a recognition method. Furthermore, recognition accuracy may be increased by combining these techniques.

The composition adjustment unit 32 compensates the moving path in such a manner that the subject recognized by the subject recognition unit 31 is included within the display frame and adjusts a composition of the moving image by performing adjustment processing on the size of the display frame. First, a first embodiment of composition adjustment by the composition adjustment unit 32 is described referring to FIG. 21A, FIG. 21B, FIG. 21C, and FIG. 21D.

Figure 21A:
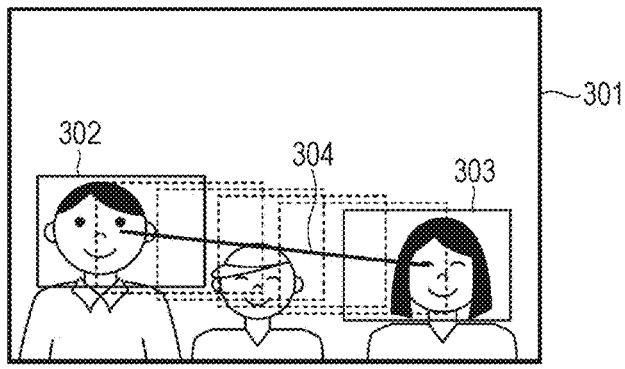
FIG. 21A is a diagram illustrating one example of composition adjustment processing by a composition adjustment unit.
Figure 21B:
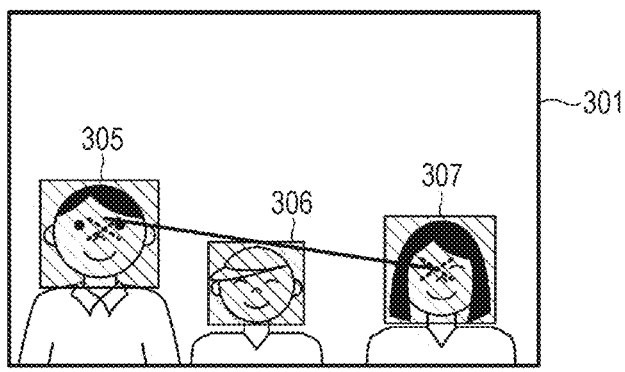
FIG. 21B is a diagram illustrating one example of the composition adjustment processing by the composition adjustment unit.

In FIG. 21A, the beginning display frame 302, a terminating display frame 303, and the moving path 304 are displayed on a processing-target image 301, based on the inputting by the user. Furthermore, the trace of the movement of the display frame along the moving path 304 is indicated by a dashed line. FIG. 21B indicates objects recognized by the subject recognition unit 31. It is understood from FIG. 21B that, three persons as the objects, a first subject 305, a second subject 306, and a third subject 307 are recognized in the processing-target image 301.

It is understood from a comparison between FIGS. 21A and 21B that in the beginning display frame 302, the terminating display frame 303, and the moving path 304 which are illustrated in FIG. 21A, one part of the second subject 306 is not fitted into the display frame. When the moving image is created in this state, the entire second subject 306 is not fitted into the moving image.

Figure 21C:
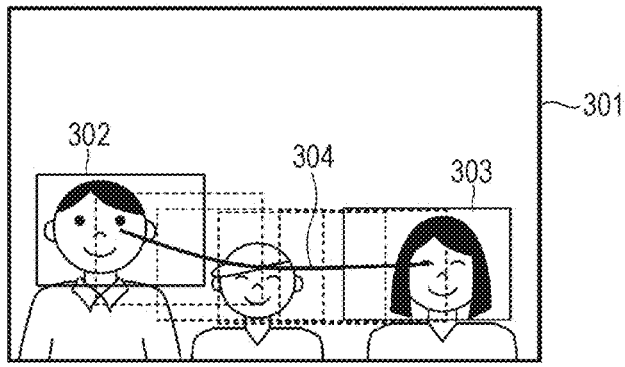
FIG. 21C is a diagram illustrating one example of the composition adjustment processing by the composition adjustment unit.

Then, as illustrated in FIG. 21C, the composition adjustment unit 32 adjusts the composition of the moving image by compensating the moving path 304 in such a manner that all the subjects recognized are fitted into the display frame. In FIG. 21C, the moving path 304 is compensated in such a manner as to smoothly curve downward in the vicinity of the second subject 306 so that the second subject 306 also is fitted into the display frame.

Figure 21D:
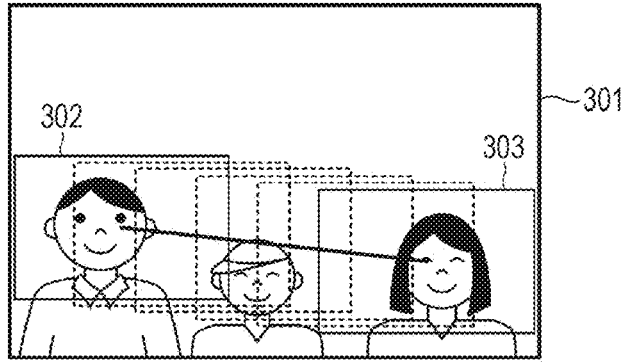
FIG. 21D is a diagram illustrating one example of the composition adjustment processing by the composition adjustment unit.

Furthermore, as illustrated in FIG. 21D, the composition adjustment unit 32 may adjust the composition of the moving image by adjusting the size of the display frame so that all the subjects including the second subject 306 are fitted into the display frame. In FIG. 21D, the sizes of the beginning display frame 302 and the terminating display frame 303 are increased so that all the subject are fitted into the display frame. The compensating of such a moving path and the compensating of the display frame can be performed by comparing a region that is recognized as the subject and a region that becomes the display range by moving the display frame along the moving path.

Moreover, the composition adjustment unit 32 may adjust the composition of the moving image by combining the compensating of the moving path and the adjusting of the size of the display frame.

Figure 22A:
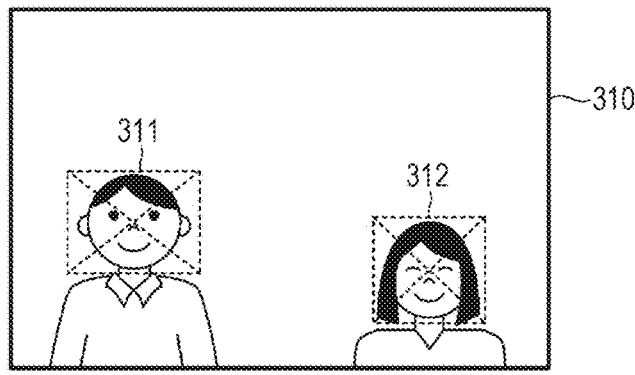
FIG. 22A is a diagram illustrating a different example of the composition adjustment processing by the composition adjustment unit.
Figure 22B:
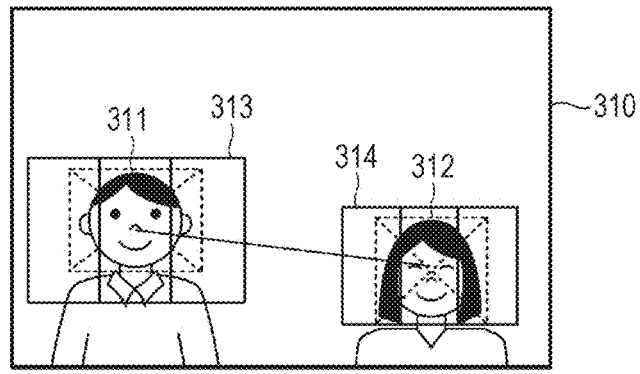
FIG. 22B is a diagram illustrating a different example of the composition adjustment processing by the composition adjustment unit.
Figure 22C:
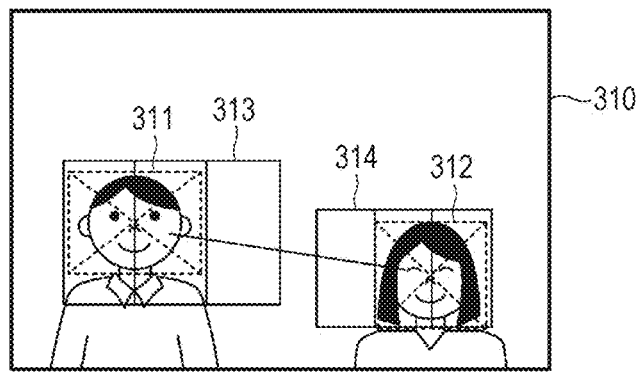
FIG. 22C is a diagram illustrating a different example of the composition adjustment processing by the composition adjustment unit.

Next, a second embodiment of composition adjustment by the composition adjustment unit 32 is described referring to FIG. 22A, FIG. 22B, and FIG. 22C. First, as illustrated in FIG. 22A, two persons, a first subject 311 and a second subject 312 in a processing-target image 310 are set to be recognized by the subject recognition unit 31. Furthermore, as illustrated in FIG. 22B, a beginning display frame 313 and a terminating display frame 314 are set based on the inputting by the user.

Then, as illustrated in FIG. 22C, the composition adjustment unit 32 adjusts a position of a beginning display frame 313 by adjusting a position of the starting point of the moving path in such a manner that the center of the first subject 311 is consistent with a position equivalent to one-third of the beginning display frame 313. Also with regard to the terminating display frame 314, in the same manner, the composition adjustment unit 32 adjusts a position of the terminating display frame 314 by adjusting a position of the ending point of the moving path in such a manner that the center of the second subject 312 is consistent with a position equivalent to one-third of the terminating display frame 314. In addition, the positioning of the object to the position equivalent to one-third of the display frame is a composition, referred to as a so-called rule of thirds, for presenting a beautiful sight and thus making a photograph look better.

In this manner, the moving image can be created in which the recognized display frame is achieved with a better composition. In addition, the adjusting of the position of the display frame does not necessarily have to be based on the rule of thirds. The composition for presenting the beautiful sight based on a predetermined ratio and thus making the photograph look better may be possible. As such a composition, there are a composition based on a railman ratio, a composition based on a bisection rule, a composition based a golden ratio, and the like. The user may be given an option of selecting which composition is used before processing.

The image processing device 30 according to the third embodiment is configured as described above. In addition, the third embodiment is the same as the first embodiment in that the image processing device 30 operates in the apparatus such as the imaging apparatus, the smart phone, the personal computer, the tablet terminal, and the server, in that the image processing device 30 may be configured as a single image processing device, and in that the image processing device 30 may be provided as a program.

3-2. Processing in the Image Processing Device

Figure 23:
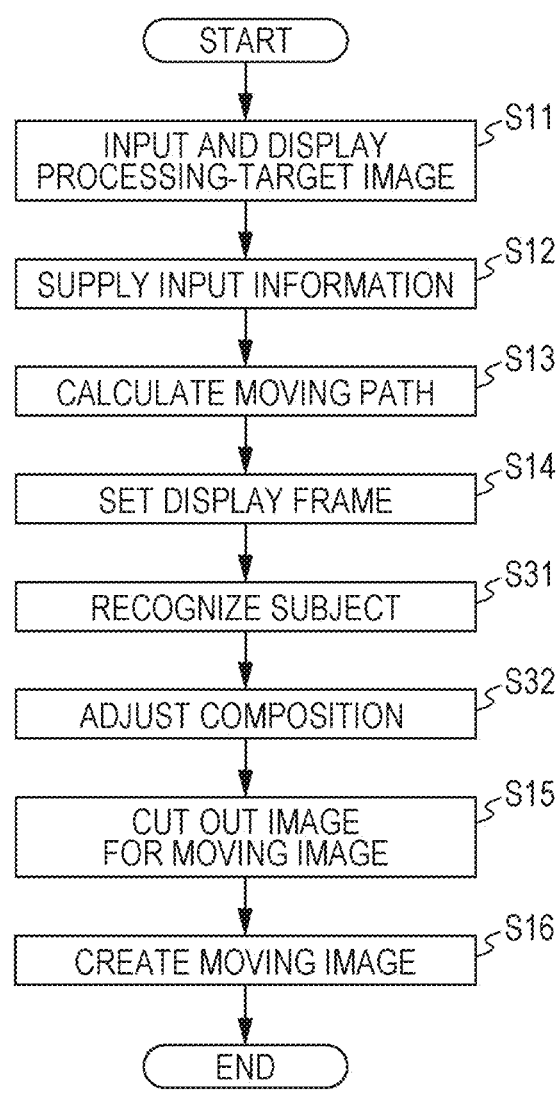
FIG. 23 is a flow chart illustrating a flow of processing by the image processing device according to the third embodiment.

FIG. 23 is a flow chart illustrating a flow of processing according to the third embodiment of the present technology. Moreover, the same processing as in the first and second embodiments are given like step numbers, and their descriptions are omitted.

In Step S11 to Step S14, the inputting of the processing-target image, the calculating of the moving path by the moving-path calculation unit 12, and the setting of the display frame by the display frame setting unit 13 are performed. Thereafter, in Step S31, the subject recognition processing is performed by the subject recognition unit 31. In addition, the subject recognition processing may be performed before the calculating of the moving path and the setting of the display frame.

Next, in Step S32, composition adjustment processing is performed by the composition adjustment unit 32. Then, in Step S15 and Step S16, the creating of the moving image is performed by the moving-image creation unit 14, based on the moving path and the display frame that are adjusted.

The third embodiment of the present technology is configured as described above. According to the third embodiment, since the moving path and/or the size of the display frame are adjusted in such a manner that the recognized subject is included within the moving image, the subject in the processing-target image can be fitted into the moving image.

In addition, according to the third embodiment, the composition adjustment unit 32 may perform the adjusting on a shape of the display frame in addition to performing the adjusting on the size of the display frame in order to adjust the composition.

Modification Example

The embodiments according to the present technology are described in detail above, but the present technology is not limited to the embodiment described above and various modifications can be made based on the technological idea behind the present technology.

According to the embodiments, the moving image conversion unit 111 is described as converting the created moving image into the moving image format such as MPEG or AVI. However, the moving image conversion unit 111 may create information for creating the moving image, such as the moving path on the processing-target image and the size and the shape of the display frame, as metadata, and may match the processing-target image and the metadata to each other for retention in the storage unit and the like. Then, the moving image is temporarily created from the processing-target image and is reproduced by referring to the metadata under the control of the control unit 11. According to this method, savings in a retention region such as the storage unit can be made because the image data and the metadata incidental to the image data are generally smaller in size than moving image data.

Figure 24:
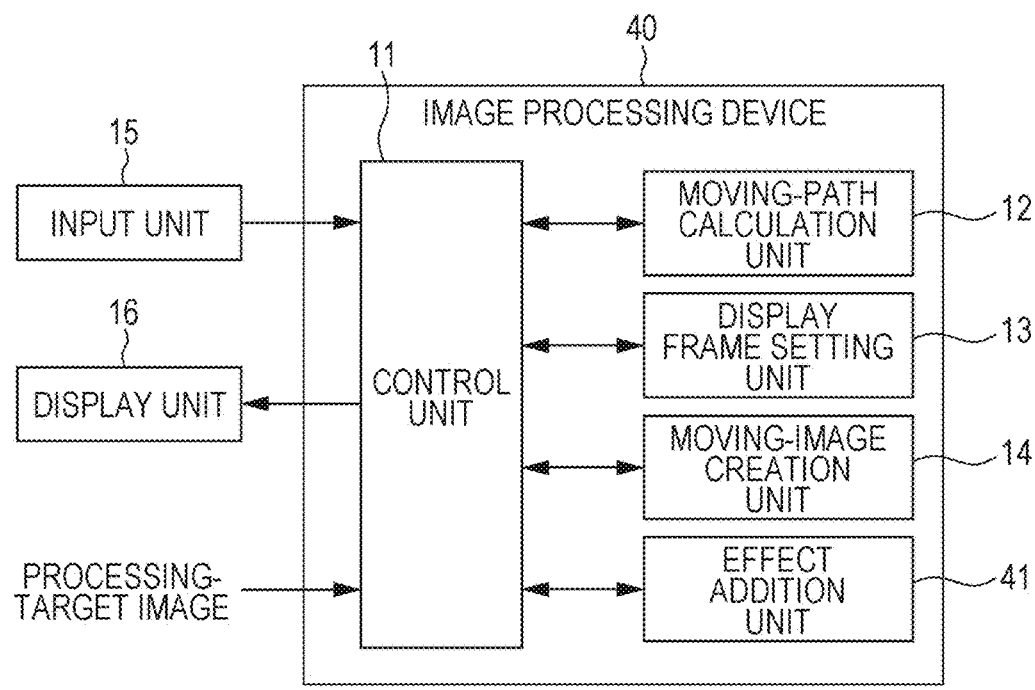
FIG. 24 is a block diagram illustrating a configuration of an image processing device according to a modification example of the present technology.

Furthermore, in the case of creating the moving image, sound may be added to the moving image. In such a case, as illustrated in FIG. 24, an image processing device 40 includes an effect addition unit 41. The effect addition unit 41 performs processing that adds background music (BGM), effect sound, voice message and the like to the moving image.

As a method by which the user inputs an instruction to add voice, for example, if the input unit is the touch panel, the finger is brought into contact with a desired subject on the processing-target image, and while the finger remains in contact, the voice is input into a microphone with which the imaging apparatus or the like is equipped. Then, the effect addition unit matches the subject with which the finger remains in contact and the voice to each other. Thus, when the subject appears in the moving image, the effect addition unit, causes the voice matched to the subject to be reproduced. Furthermore, the user may select the subject using an icon such as a frame for selecting the subject and may input the voice in such a manner that the voice is mapped to the subject.

In addition, the inputting of the instruction to add the voice may be possible either before or after inputting the moving path and the display frame. Furthermore, the voice is not limited to only the voice that is input from the microphone, and voice data and the like retained by an apparatus equipped with the image processing device 10 or a function of the image processing device 10 may be possible.

Furthermore, based on a result of the recognition by the subject recognition unit 31, the composition adjustment unit 32 may automatically set the moving path of the display frame and the size and the shape of the display frame without the recognized subject being fitted into the display frame.

Furthermore, the composition adjustment unit 32 may automatically the moving path of the display frame and the size and the shape of the display frame in such a manner that the recognized subject is fitted into the display frame so that the subject recognized by the subject recognition unit 31 is fitted into an optimal composition, based on the rule of thirds described above.

The present technology can be applied not only to the still image but also to the moving image. The impressive moving image in which a specific subject in the original moving image can further receive a viewer's attention can be created by the application to the moving image.

Figure 25:
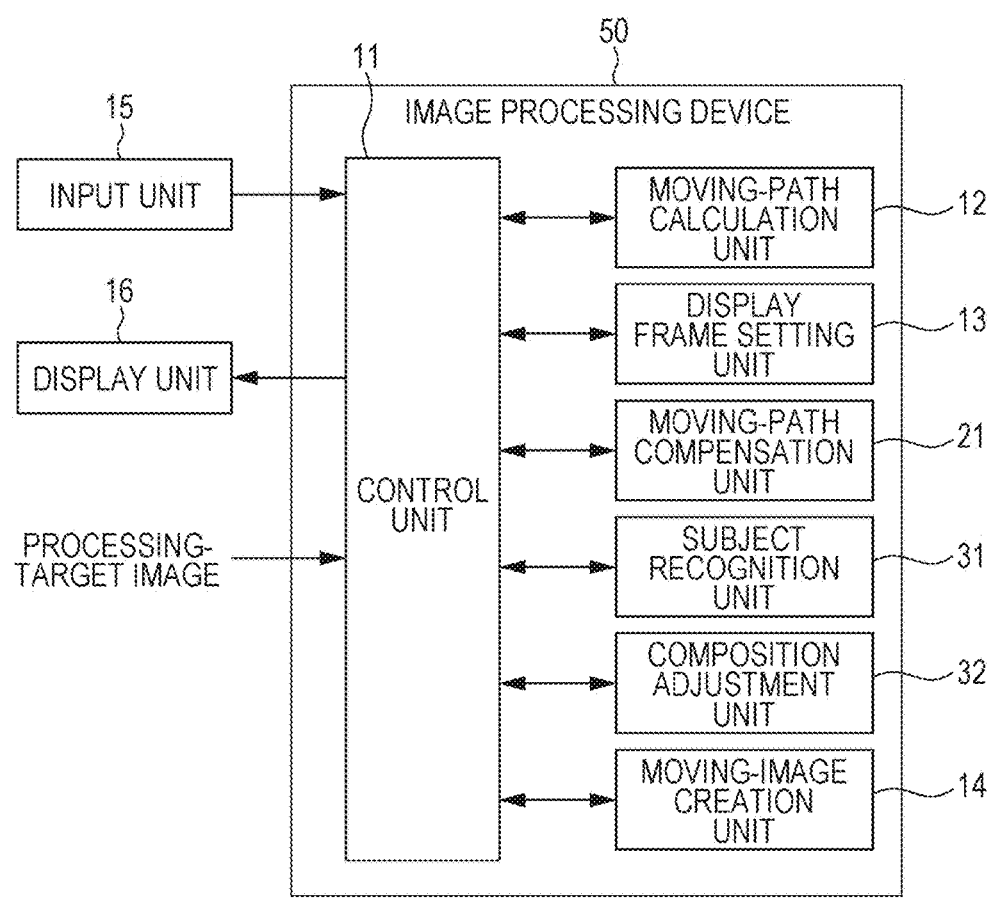
FIG. 25 is a block diagram illustrating a configuration of the image processing device according to the modification example of the present technology.

Furthermore, by combining the second embodiment and the third embodiment, as illustrated in FIG. 25, an image processing device 50 may be configured to include a moving-path compensation unit 21, a subject recognition unit 31 and a composition adjustment unit 32.

According to the second embodiment described above, the moving-path compensation unit 21 is described as compensating the moving path calculated by the moving-path calculation unit 12. However, the moving-path compensation unit 21 may compensate the coordinate information that is converted from the input information and the moving-path calculation unit 12 may obtain the moving path, based on the compensated coordinate information in order for the moving path to be in a straight line or in a smooth curved line.

Furthermore, the present technology can have also the following configurations.

(1) A system comprising: circuitry configured to receive a user input, the user input being a gesture, smooth a trajectory of the user input to generate a smoothed trajectory, when the user input is a first gesture tracing the trajectory over an image, and apply an effect to the image to cause a target image to be enlarged and displayed on a display screen and to cause the target image to move based on the smoothed trajectory, the target image being a subset of the image.

(2) The system of (1), wherein the circuitry is further configured to apply an effect to the image to cause the target image to zoom based on a second gesture operating on the image as the user input.

(3) The system of any one of (1) to (2), wherein the circuitry causes the target image to move along the smoothed trajectory at a speed corresponding to a speed of the first gesture.

(4) The system of any one of (1) to (4), wherein the circuitry is further configured to set the target image at a default location on the image based on the user input, the target image having a default size.

(5) The system of (4), wherein the default location circuitry is further configured to place the target image at a location on the image corresponding to an initial user-touch point on a display surface.

(6) The system of (5), wherein the smoothed trajectory starts at the initial user-touch point and ends at a point where the user touch on the display surface ends, and the circuitry is configured to move the target image along the smoothed trajectory.

(7) The system of (6), wherein the circuitry is further configured to preview movement of the target image, and to receive additional user input of an additional first gesture to re-input the trajectory.

(8) The system of (7), wherein the circuitry is further configured to cause display of a button to retain the movement of the target image as a movie.

(9) The system of (8), wherein the circuitry is configured to create a movie by applying the effect to the image to cause the target image to move based on the user input.

(10) The system of any one of (1) to (9), wherein the first gesture traces the trajectory over the displayed image as a series of points.

(11) The system of (10), wherein the circuitry causes the target image to move along the smoothed trajectory at a speed according to a distance between adjacent points.

(12) The system of (11), wherein the circuitry causes the target image to move along the smoothed trajectory at a faster rate in sections of the trajectory where the distance between adjacent points is shorter than in areas of the trajectory where the distance between adjacent points is longer.

(13) The system of any one of (1) to (12), wherein the circuitry cause a size of the target image to be reduced or increased based on a pressure component of the second gesture.
(14) The system of (13), wherein the circuitry causes a size of the target image to decrease with an increase in the pressure component of the second gesture.
(15) The system of any one of (13) to (14), wherein the circuitry causes a size of the target image to increase with a decrease in the pressure component of the second gesture.
(16) The system of (15), wherein the circuitry causes a continued reduction of size of the target image based on an increasing distance between the user's hand making the second gesture and an input surface.
(17) An apparatus comprising: circuitry configured to receive a user input, the user input being a gesture, smooth a trajectory of the user input to generate a smoothed trajectory, when the user input is a first gesture tracing the trajectory over an image, and apply an effect to the image to cause a target image to be enlarged and displayed on a display screen and to cause the target image to move based on the smoothed trajectory, the target image being a subset of the image.
(18) A method comprising: receiving, at a circuit, a user input, the user input being a gesture; smoothing a trajectory of the user input to generate a smoothed trajectory, when the user input is a first gesture tracing the trajectory over an image; and applying an effect to the image to cause a target image to be enlarged and displayed on a display screen and to cause the target image to move based on the smoothed trajectory, the target image being a subset of the image.
(19) A non-transitory computer-readable medium encoded with computer-readable instructions thereon, the computer-readable instructions when executed by a computer cause the computer to perform a method comprising: receiving, at a circuit, a user input, the user input being a gesture; smoothing a trajectory of the user input to generate a smoothed trajectory, when the user input is a first gesture tracing the trajectory over an image; and applying an effect to the image to cause a target image to be enlarged and displayed on a display screen and to cause the target image to move based on the smoothed trajectory, the target image being a subset of the image.
(20) An image processing method, including obtaining a moving path of a frame designating an area that is cut out of a processing-target image, based on successive multiple positions that are input by a user into the processing-target image, and cutting the multiple images out of the processing-target image along the moving path, and creating a moving image using the multiple images.
(21) The image processing method according to (20), in which the inputting by the user is performed on a touch panel, and the multiple positions on the processing-target image are input by a tracing operation in which the user moves a contact object a predetermined distance in a predetermined direction while the user makes the contact object remain in contact with the touch panel.
(22) The image processing method according to (20) or (21), in which a size of the frame is set depending on the inputting by the user.
(23) The image processing method according to any one of (20) to (22), in which the obtained moving path is compensated.
(24) The image processing method according to (23), in which the moving path is compensated in such a manner as to be in a straight line or in a smooth curved line.
(25) The image processing method according to any one of (20) to (24), further including recognizing a subject in the processing-target image and adjusting a composition of the moving image based on a result of the recognition.
(26) The image processing method according to (25), in which the composition of the moving image is adjusted by adjusting the moving path in such a manner that the recognized subject is fitted into the frame.
(27) The image processing method according to (25) or (26), in which the composition of the moving image is adjusted by adjusting a size of the frame in such a manner that the recognized subject is fitted into the frame.
(28) The image processing method according to any one of (25) to (27), in which the composition of the moving image is adjusted by adjusting a position of the frame in the processing-target image in such a manner that the recognized subject is positioned in a predetermined position within the frame.
(29) The image processing method according to (28), in which the predetermined position within the frame is a position that is based on a ratio that is determined in advance.
(30) The image processing method according to (21), in which the moving image is created by changing a reproduction speed of the moving image, depending on a speed of the tracing operation by the user.
(31) The image processing method according to any one of (20) to (30), in which the inputting by the user is performed on a hardware button, and the multiple positions on the processing-target image are input by plotting the multiple positions on the processing-target image using the hardware button.
(32) The image processing method according to (31), in which the moving image is created by changing the reproduction speed of the moving image, based on distances among the multiple positions plotted on the processing-target image.
(33) The image processing method according to any one of (20) to (32), in which the processing-target image is an image that results from combining the multiple images.
(34) An image processing device, including a moving-path calculation unit that obtains a moving path of a frame designating a area that is cut out of a processing-target image, based on successive multiple positions that are input by a user into the processing-target image, and a moving-image creation unit that cuts out multiple images along the moving path from the processing-target image, and creates a moving image using the multiple images.
(35) An image processing program for causing a computer to perform an image processing method, the method including obtaining a moving path of a frame designating a area that is cut out of a processing-target image, based on successive multiple positions that are input by a user into the processing-target image, and cutting multiple images out of the processing-target image, along the moving path and creating a moving image using the multiple images.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

10, 20, 30, 40, 50: Image processing device
11: Control unit
12: Moving-path calculation unit 13: Display frame setting unit
14: Moving-image creation unit
15: Input unit
16: Display unit
21: Moving-path compensation unit
31: Subject recognition unit
32: Composition adjustment unit
41: Effect addition unit

The invention claimed is:

1. A system, comprising:
a display device configured to display a first image, wherein the display device comprises a touch panel, and wherein the first image comprises a target image; and
circuitry configured to:
receive a user trace operation on the touch panel, wherein the user trace operation corresponds to a path of movement of an object on the touch panel, and
wherein the object is associated with a user;
determine a trajectory based on the user trace operation, wherein the trajectory is along the path of movement of the object;
recognize a plurality of subjects in the displayed first image based on brightness distribution information of each of the plurality of subjects;
compensate the trajectory to generate one of a straight line trajectory or a smooth curved line trajectory based on the recognition of the plurality of subjects, wherein the trajectory is different from the straight line trajectory and the smooth curved line trajectory;
control the display device to:
display a second image as a first enlarged view of content of the target image, wherein the content corresponds to at least one portion of the first image, and
move the target image along one of the straight line trajectory or the smooth curved line trajectory; and
control a first speed of the movement of the target image on the display device along one of the straight line trajectory or the smooth curved line trajectory, based on a second speed of the user trace operation on the touch panel.

2. The system according to claim 1, wherein the circuitry is further configured to control the display device to display a third image as a second enlarged view of the target image, based on a user input operation.

3. The system according to claim 1, wherein the circuitry is further configured to control the display device to display the target image at a default location on the first image based on the user trace operation.

4. The system according to claim 3,
wherein the circuitry is further configured to control the display device to display the target image at a first location on the first image, based on the user trace operation, and
wherein the first location corresponds to a first touch point on the touch panel at which the object comes in contact with the touch panel.

5. The system according to claim 4, wherein:
one of the straight line trajectory or the smooth curved line trajectory starts at the first touch point and ends at a second touch point on the touch panel, wherein the second touch point is a point at which the object loses contact with the touch panel, and
the circuitry is further configured to control the display device to display the target image such that the target image moves along one of the straight line trajectory or the smooth curved line trajectory.

6. The system according to claim 5, wherein the circuitry is further configured to control the display device to display a preview of the movement of the target image.

7. The system according to claim 6,
wherein the circuitry is further configured to:
control the display device to display a button, and
retain the movement of the target image as a movie, based on a user touch operation on the button.

8. The system according to claim 1, wherein the trajectory comprises a series of points over the displayed first image.

9. The system according to claim 8, wherein the first speed is further based on a first distance between a first set of consecutive points of the series of points.

10. The system according to claim 1,
wherein the circuitry is further configured to control the display device to display the target image such that the target image moves along one of the straight line trajectory or the smooth curved line trajectory at the first speed in at least a first section of one of the straight line trajectory or the smooth curved line trajectory, and at a third speed in at least a second section of one of the straight line trajectory or the smooth curved line trajectory, and
wherein a first distance between a first set of consecutive points in the at least the first section is shorter than a second distance between a second set of consecutive points in the at least the second section.

11. The system according to claim 10, wherein the first speed is less than the third speed.

12. The system according to claim 1, wherein the circuitry is further configured to control a size of the target image based on a pressure component of a touch operation on the touch panel.

13. The system according to claim 12, wherein the circuitry is further configured to decrease the size of the target image based on an increase in the pressure component of the touch operation.

14. The system according to claim 12, wherein the circuitry is further configured to increase the size of the target image based on a decrease in the pressure component of the touch operation.

15. The system according to claim 1, wherein the circuitry is further configured to decrease a size of the target image based on an increase in a distance between the object and the touch panel.

16. The system according to claim 1, wherein the circuitry is further configured to adjust a composition of the moving target image to include the plurality of subjects of the target image in a display frame.

17. An apparatus, comprising:
a display device configured to display a first image, wherein the display device comprises a touch panel, and wherein the first image comprises a target image; and
circuitry configured to:
receive a user trace operation on the touch panel, wherein the user trace operation corresponds to a path of movement of an object on the touch panel, and
wherein the object is associated with a user;
determine a trajectory based on the user trace operation, wherein the trajectory is along the path of movement of the object;

recognize a plurality of subjects in the displayed first image based on brightness distribution information of each of the plurality of subjects;

compensate the trajectory to generate one of a straight line trajectory or a smooth curved line trajectory based on the recognition of the plurality of subjects, wherein the trajectory is different from the straight line trajectory and the smooth curved line trajectory;

control the display device to:
   display a second image as an enlarged view of content of the target image, wherein the content corresponds to at least one portion of the first image, and
   move the target image along one of the straight line trajectory or the smooth curved line trajectory; and control a first speed of the movement of the target image on the display device along one of the straight line trajectory or the smooth curved line trajectory, based on a second speed of the user trace operation on the touch panel.

18. A method, comprising:

displaying, on a display device, a first image, wherein the first image comprises a target image;

receiving a user trace operation, wherein the user trace operation corresponds to a path of movement of an object, and wherein the object is associated with a user;

determining a trajectory based on the user trace operation, wherein the trajectory is along the path of movement of the object;

recognizing a plurality of subjects in the displayed first image based on brightness distribution information of each of the plurality of subjects;

compensating the trajectory to generate one of a straight line trajectory or a smooth curved line trajectory based on the recognition of the plurality of subjects, wherein the trajectory is different from the straight line trajectory and the smooth curved line trajectory;

displaying a second image as an enlarged view of content of the target image, wherein the content corresponds to at least one portion of the first image;

controlling a movement of the target image along one of the straight line trajectory or the smooth curved line trajectory; and controlling a first speed of the movement of the target image on the display device along one of the straight line trajectory or the smooth curved line trajectory, based on a second speed of the user trace operation on a touch panel.

19. A non-transitory computer-readable medium having stored thereon computer-readable instructions, which when executed by a computer, cause the computer to execute operations, the operations comprising:

controlling a display device to display a first image, wherein the first image comprises a target image;

receiving a user trace operation, wherein the user trace operation corresponds to a path of movement of an object, and wherein the object is associated with a user;

determining a trajectory based on the user trace operation, wherein the trajectory is along the path of movement of the object;

recognizing a plurality of subjects in the displayed first image based on brightness distribution information of each of the plurality of subjects;

compensating the trajectory to generate one of a straight line trajectory or a smooth curved line trajectory based on the recognition of the plurality of subjects, wherein the trajectory is different from the straight line trajectory and the smooth curved line trajectory;

displaying a second image as an enlarged view of content of the target image, wherein the content corresponds to at least one portion of the first image;

controlling a movement of the target image along one of the straight line trajectory or the smooth curved line trajectory; and controlling a first speed of the movement of the target image on the display device along one of the straight line trajectory or the smooth curved line trajectory, based on a second speed of the user trace operation on a touch panel.

\* \* \* \* \*